United States Patent
Suzuki et al.

[11] Patent Number: 6,099,391
[45] Date of Patent: Aug. 8, 2000

[54] METHOD AND APPARATUS FOR HIGHLY STRENGTHENING METAL MEMBER

[75] Inventors: Teiji Suzuki; Tadao Kanno; Tomonori Taoka, all of Sayama, Japan

[73] Assignee: Honda Giken Kogyo Kabushiki Kaisha, Tokyo, Japan

[21] Appl. No.: 08/765,327

[22] PCT Filed: Mar. 18, 1996

[86] PCT No.: PCT/JP96/00704

§ 371 Date: Dec. 26, 1996

§ 102(e) Date: Dec. 26, 1996

[87] PCT Pub. No.: WO97/34737

PCT Pub. Date: Sep. 25, 1997

[51] Int. Cl.[7] ............. B24B 1/00; B24B 57/00; B24C 3/18

[52] U.S. Cl. ............. 451/39; 451/47; 451/53; 451/60; 451/82; 451/89; 451/99; 451/446; 451/453; 451/456; 29/90.7

[58] Field of Search ............ 29/90.7; 72/53; 451/8, 38, 39, 40, 47, 53, 60, 80, 82, 89, 99, 398, 446, 453, 456

[56] References Cited

U.S. PATENT DOCUMENTS

| | | |
|---|---|---|
| 3,516,847 | 6/1970 | Maker et al. . |
| 3,516,874 | 6/1970 | Maker et al. . |
| 3,820,419 | 6/1974 | McLagan . |
| 4,034,585 | 7/1977 | Straub . |
| 4,167,864 | 9/1979 | Taipale . |
| 4,848,123 | 7/1989 | Thompson . |
| 4,995,202 | 2/1991 | Gardner et al. .......... 451/102 |
| 5,176,018 | 1/1993 | Thompson . |
| 5,182,882 | 2/1993 | Brodene et al. .......... 451/36 |
| 5,325,639 | 7/1994 | Kuboyama et al. ....... 451/39 |
| 5,327,755 | 7/1994 | Thompson . |
| 5,365,762 | 11/1994 | Thompson . |
| 5,586,927 | 12/1996 | Herbert ................... 451/88 |
| 5,637,030 | 6/1997 | Chopra et al. ........... 451/39 |
| 5,709,587 | 1/1998 | Shaffer ................ 451/39 X |
| 5,827,114 | 10/1998 | Yam et al. ............... 451/75 |

FOREIGN PATENT DOCUMENTS

| | | |
|---|---|---|
| 0218354 | 11/1990 | European Pat. Off. . |
| 56-139296 | 10/1981 | Japan . |
| 62-63614 | 3/1987 | Japan . |
| 52-1711 | 4/1987 | Japan . |
| 6-417817 | 1/1989 | Japan . |
| 533047 | 2/1993 | Japan . |
| 6172850 | 6/1994 | Japan . |

*Primary Examiner*—Timothy V. Eley
*Attorney, Agent, or Firm*—Birch, Stewart, Kolasch & Birch, LLP

[57] ABSTRACT

A mixture of water and glass beads is ejected to a root of a gear which has been cut to form gear teeth. The glass beads are oriented so as to be ejected to the root, and the glass beads and the water impart compressive stresses to the surface of the root and grind the surface of the root.

36 Claims, 31 Drawing Sheets

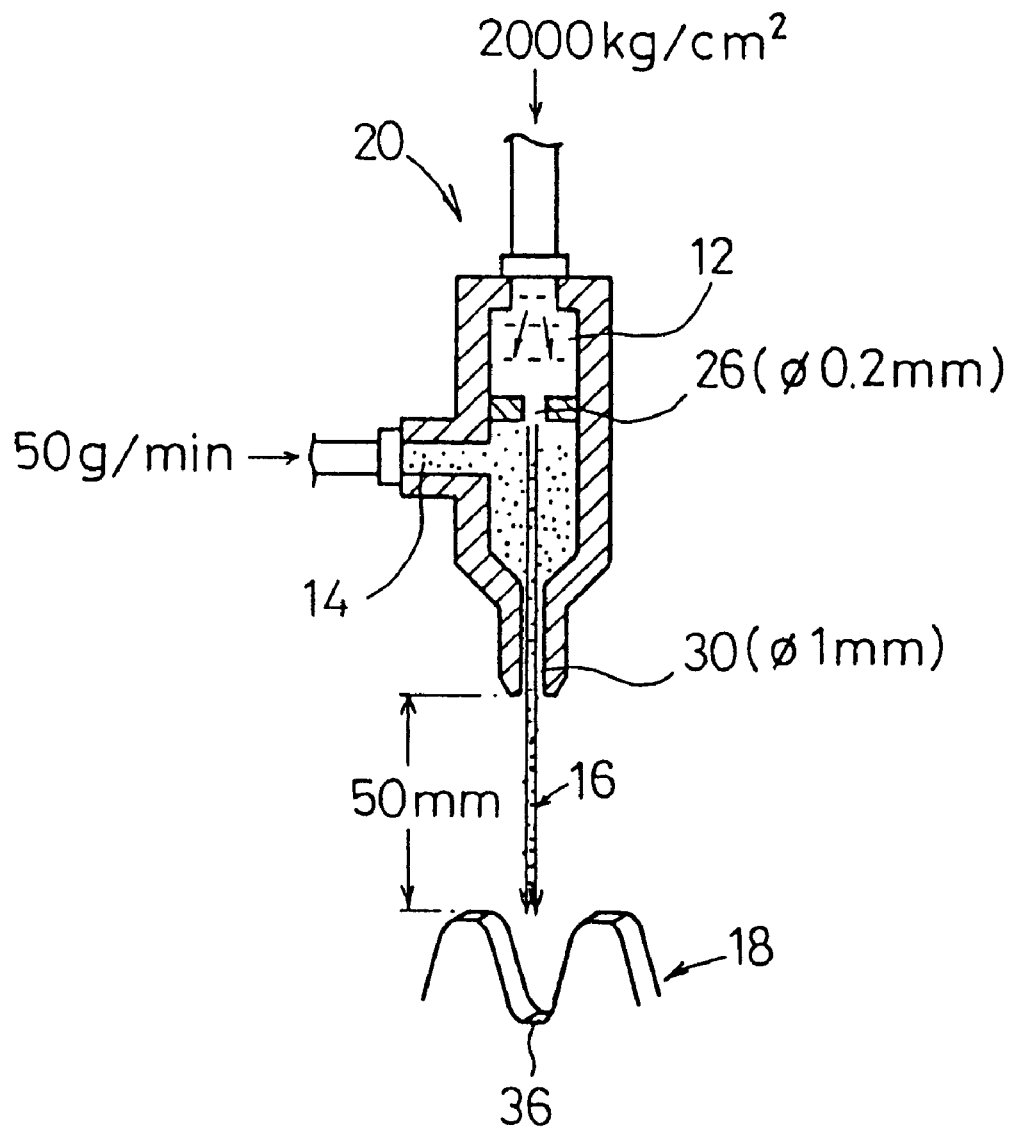

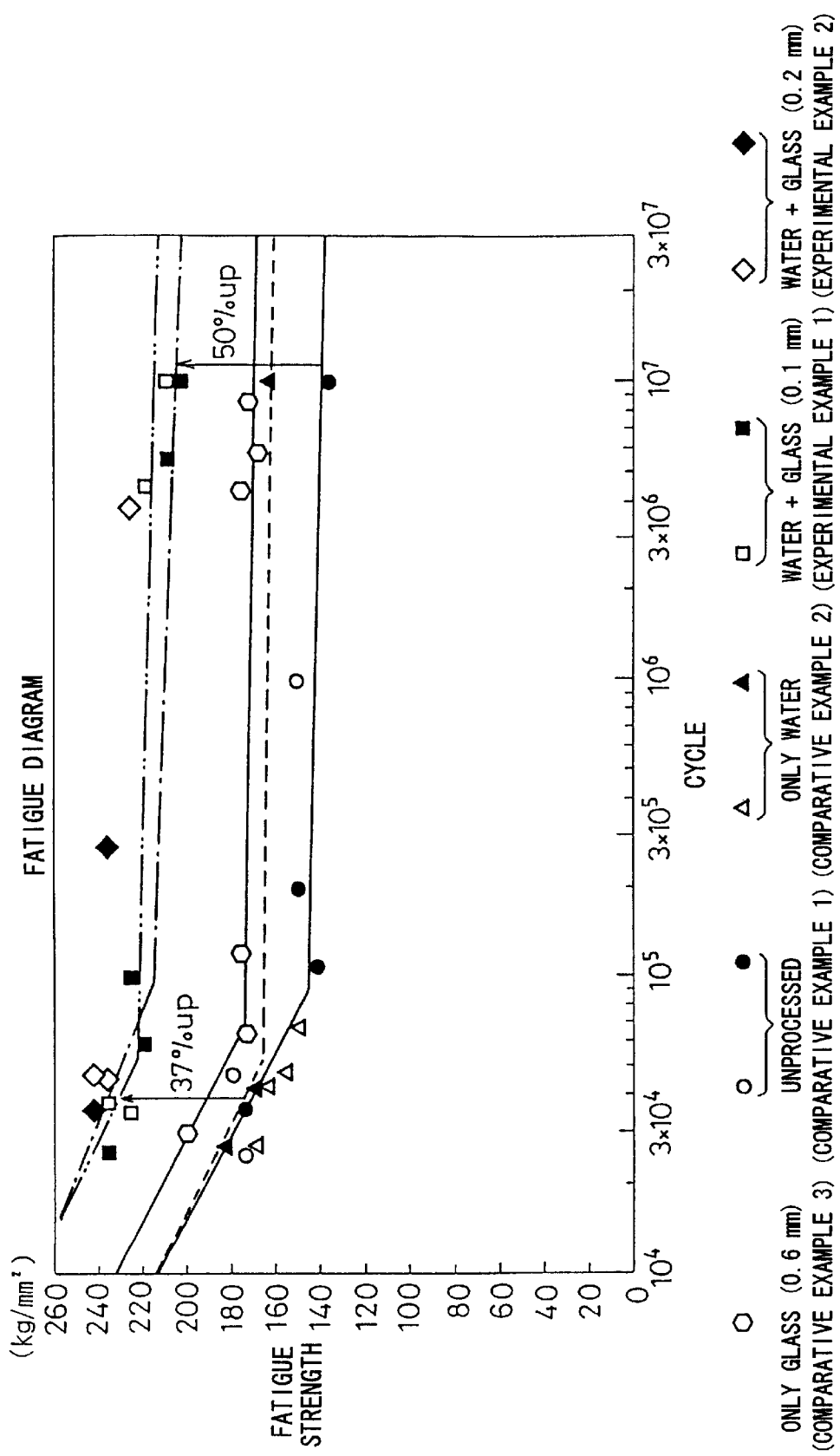

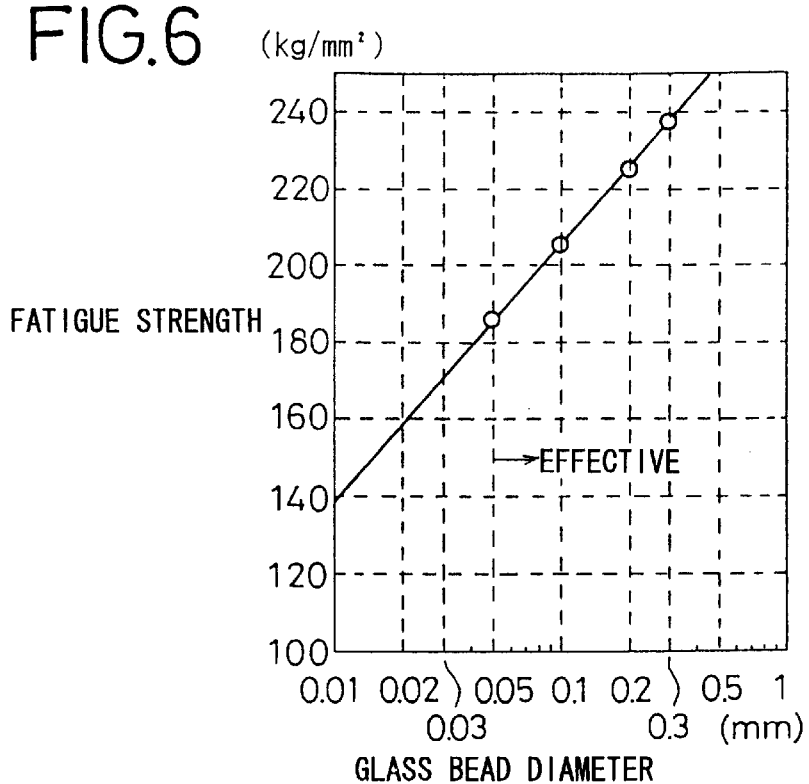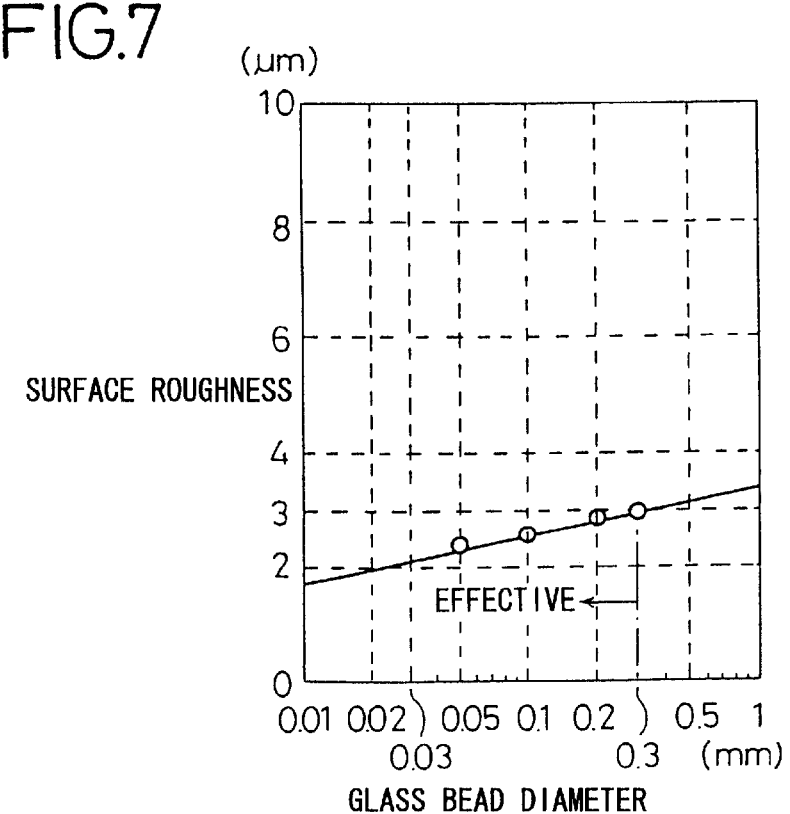

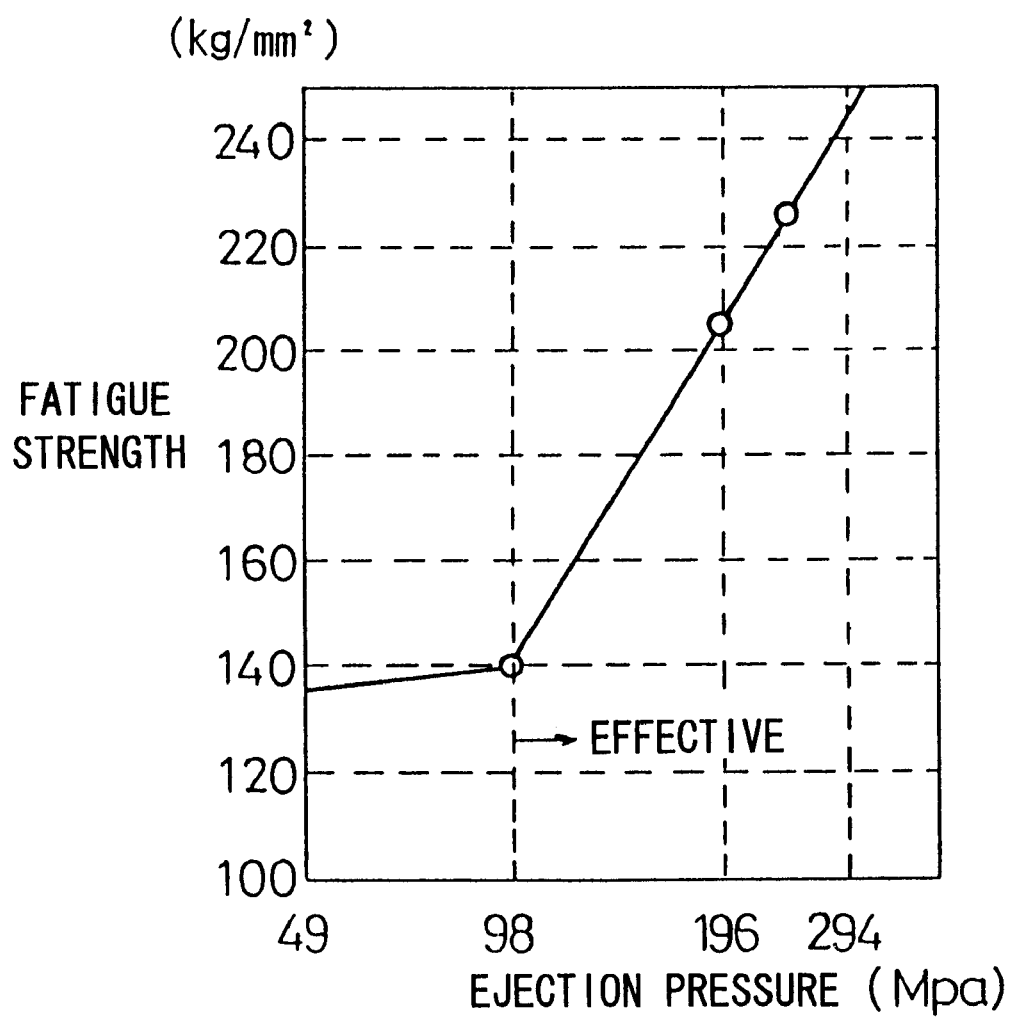

PCD CASE-HARDENED

PCD PROCESSED

ROOT CASE-HARDENED

ROOT PROCESSED

F I G. 16
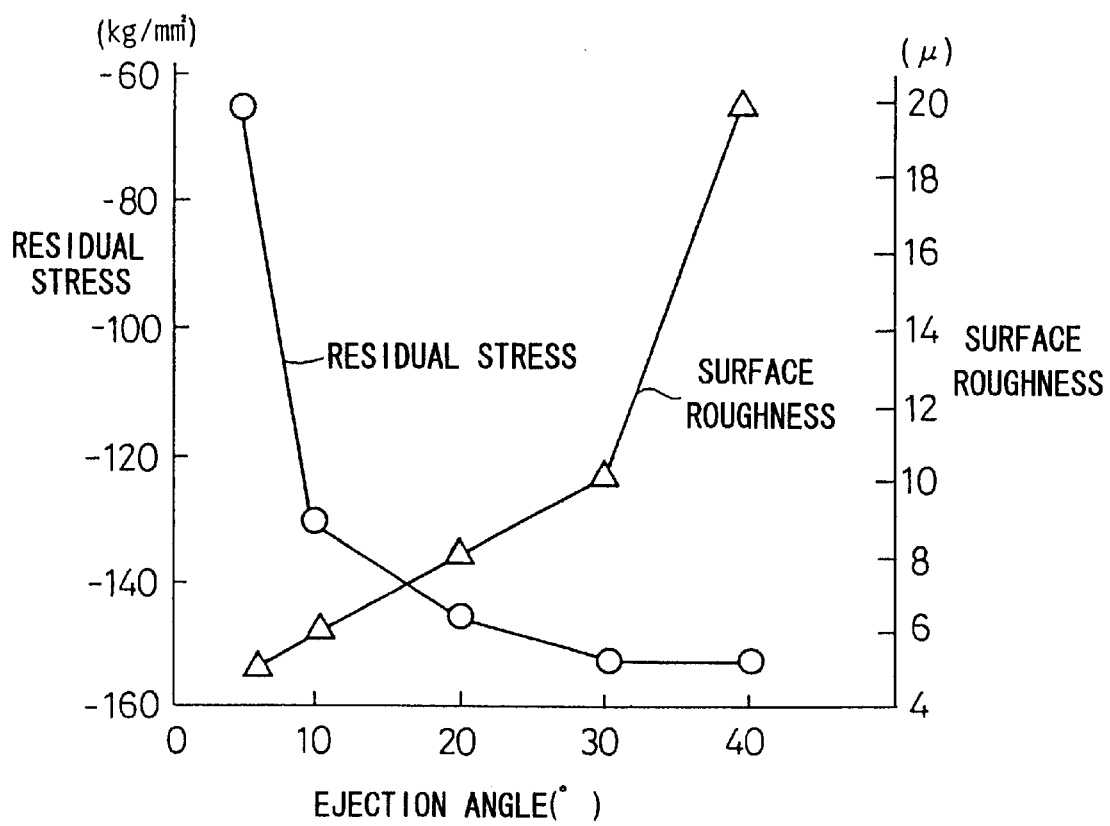

FIG.33
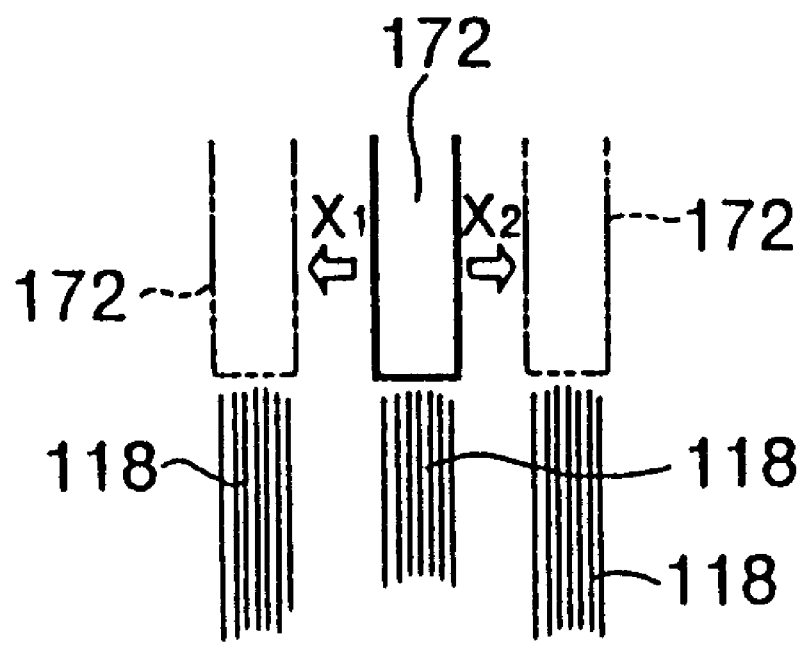
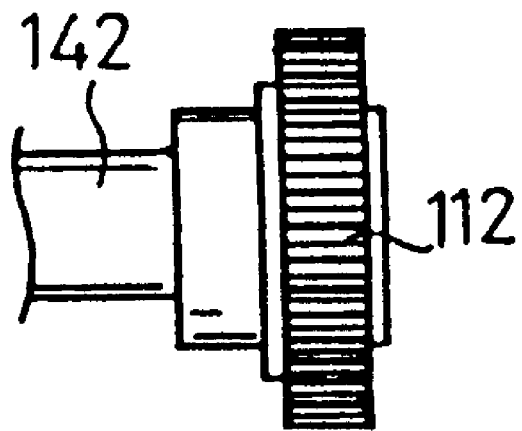

METHOD AND APPARATUS FOR HIGHLY STRENGTHENING METAL MEMBER

TECHNICAL FIELD

The present invention relates to a method of and an apparatus for increasing the strength of a metal component after it has been cut to shape.

BACKGROUND ART

Metal components such as gears which are exposed to repetitive loads in use are required to have an increased fatigue strength on their surfaces. To meet such a requirement, shot peening has widely been employed in the art to apply compressive residual stresses by blasting the surface of the metal component with steel balls or the like.

For example, Japanese laid-open patent publication No. 5-33047 discloses a shot peening process in which blasting balls are applied to gear tooth flanks at an angle greater than if they were applied in a direction normal to the axis of the gear. The disclosed shot peening process serves the purpose of increasing compressive residual stresses of the gear tooth flanks.

While the disclosed shot peening process can increase compressive residual stresses of the tooth flanks, the blasting balls cannot sufficiently be applied to the roots of teeth because of the large angle at which the blasting balls are applied to the tooth flanks, failing to give desired compressive residual stresses to the roots or bottom lands of the gear. Furthermore, the large angle at which the blasting balls are applied to the tooth flanks makes it difficult to remove an oxide layer that has been formed on the tooth flanks by a heat treatment, and tends to leave a step between the tooth flanks and the roots of the gear.

Japanese laid-open patent publication No. 6-172850 reveals an apparatus for ejecting hard balls together with a liquid under pressure from a hard ball ejecting means to apply compressive residual stresses to the roots or bottom lands of a gear. The disclosed apparatus is capable of increasing the compressive residual stresses of the roots of the gear. However, the apparatus does not give consideration to the application of compressive residual stresses to tooth flanks.

The shot peening processes of the type described above use steel balls as the blasting balls and hard balls. Consequently, the surfaces blasted with the steel balls are roughened, making their surface roughness poor.

One solution is to employ a process of increasing the strength of a metal surface by annealing the surface of a shaped metal component, grinding the metal surface, and thereafter blasting the metal surface with glass beads whose diameters are in the range from 0.2 mm to 0.6 mm, as disclosed in Japanese patent publication No. 5-21711. This process is effective to increase the fatigue strength of the metal component without roughening the metal surface.

The above conventional process is capable of improving the metal surface roughness, but cannot increase the fatigue strength up to a desired value because of a reduction in the applied compressive residual stresses. Furthermore, inasmuch as the glass beads that are applied to the metal surface are not highly orientated, they tend to be scattered in various directions. Therefore, the blasting efficiency is very low when the glass beads are applied to the roots of a gear and gear surfaces thereof which extend from the tooth flanks to the roots of the gear.

The glass beads are crushed when they collide with the gear surfaces which are metal surfaces. Consequently, glass bead dust or particulate dust having particle sizes in microns are suspended in a processing chamber in which the metal component or gear is processed. In the processing chamber, the gear which is being processed is mounted on a spindle and rotated at a high speed, and the fine particulate dust is liable to be attached to the spindle. Therefore, the spindle tends to suffer trouble such as a rotation failure or the like.

The fine glass bead dust particles also tend to be deposited on the gear surfaces. A washing process separately provided to remove any deposited glass bead dust off the gear surfaces prevents the gear from being processed efficiently for increasing its strength.

The glass beads are usually stored in a hopper, and delivered at a given rate from the hopper through a pipe which interconnects the hopper and a nozzle from which the glass beads are ejected. Since the glass beads are small in diameter, they are apt to absorb moisture and hence clog the pipe between the hopper and the nozzle. When such a glass bead clog is developed, it is impossible to apply glass beads at a desired rate to the gear surfaces, with the result that the gear cannot stably be processed for increased strength.

It is an object of the present invention to provide a method of and an apparatus for increasing the strength of a metal component to reliably improve surface roughness and fatigue strength of the metal component with high efficiency.

Another object of the present invention is to provide a method of and an apparatus for increasing the strength of a gear to exert sufficient compressive residual stresses, produce smooth surfaces extending from the tooth flanks to the roots of the gear, and reliably remove an oxide layer from the gear surfaces.

Still another object of the present invention is to provide a method of and an apparatus for increasing the strength of a gear while efficiently and reliably removing fine glass bead dust particles.

Yet still another object of the present invention is to provide a method of and an apparatus for increasing the strength of a gear with glass beads that can be supplied accurately and reliably at a predetermined rate.

DISCLOSURE OF THE INVENTION

Since a liquid mixed with glass beads is ejected to a metal component, the glass beads are oriented so as to collide accurately with a desired surface of the metal component. Compressive stresses are imparted to the surface of the metal component and the surface of the metal component is ground by the glass beads. When the glass beads are crushed by collision with the metal component, broken pieces of the crushed glass beads are pressed against the surface of the metal component by the liquid ejected to the metal component, thereby effectively grinding the metal component and removing an oxide layer.

Inasmuch as the liquid collides with the surface of the metal component, the surface of the metal component is given compressive stresses and ground by the liquid, as with the glass beads. Consequently, the glass beads are oriented to collide with the metal component, and the glass beads and the liquid effectively function to increase the strength of the metal component and grind the metal component.

BRIEF DESCRIPTION OF THE DRAWINGS

FIG. 4 is a view illustrative of experimental conditions for the method carried out by the apparatus according to the first embodiment;

FIG. 5 is a diagram showing fatigue strengths of experimental and comparative examples;

FIG. 6 is a diagram showing the relationship between the diameter of glass beads and the fatigue strength;

FIG. 7 is a diagram showing the relationship between the diameter of glass beads and the surface roughness;

FIG. 8 is a diagram showing the relationship between the pressure at which water is ejected and the fatigue strength;

FIG. 16 is a diagram showing the relationship between the ejection angle at which glass beads are applied, the residual stresses, and the surface roughness;

FIG. 33 is a view illustrative of the manner in which a nozzle is moved parallel to the transverse direction of a gear when the gear is washed;

BEST MODE FOR CARRYING OUT THE INVENTION

Figure 1:
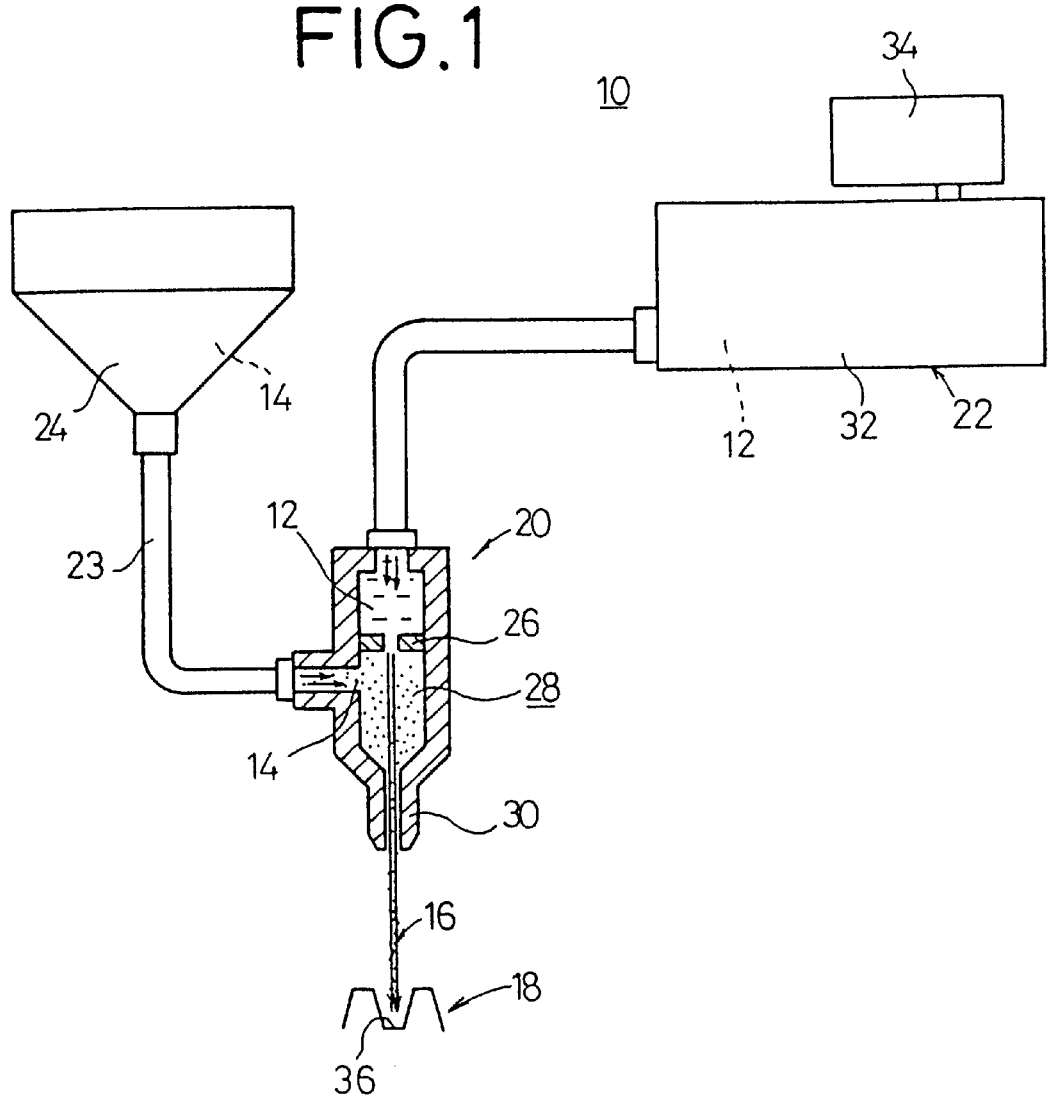
FIG. 1 is a schematic view of an apparatus for increasing the strength of a metal component according to a first embodiment of the present invention.

In FIG. 1, the reference numeral 10 represents an apparatus for carrying out a method of increasing the strength of a metal component according to a first embodiment of the present invention.

The apparatus 10 comprises an ejection mechanism 20 for applying a spouted jet 16 of a liquid such as water 12 and glass beads 14 to a metal component, e.g., a gear 18, a water supply mechanism (liquid supply mechanism) 22 for supplying the water 12 under pressure to the ejection mechanism 20, and a hopper (glass bead supply mechanism) 24 for delivering the glass beads 14 at a predetermined rate to the ejection mechanism 20 through a pipe 23.

The ejection mechanism 20 comprises a nozzle 26 connected to the water supply mechanism 22, a mixing chamber 28 for mixing the water 12 and the glass beads 14, and a nozzle orifice 30 for ejecting the spouted jet 16 of the water 12 and the glass beads 14 to the gear 18.

The water supply mechanism 22 has a surge tank 32 and a high-pressure pump 34. The high-pressure pump 34 serves to applying the spouted jet 16 of the water 12 and the glass beads 14 to the gear 18 under a pressure of at least 98 MPa. The glass beads 14 filled in the hopper 24 have diameters ranging from 0.05 mm to 0.3 mm.

The method of increasing the strength of a metal component according to the first embodiment of the present invention, using the apparatus 10, will be described below.

Figure 3:
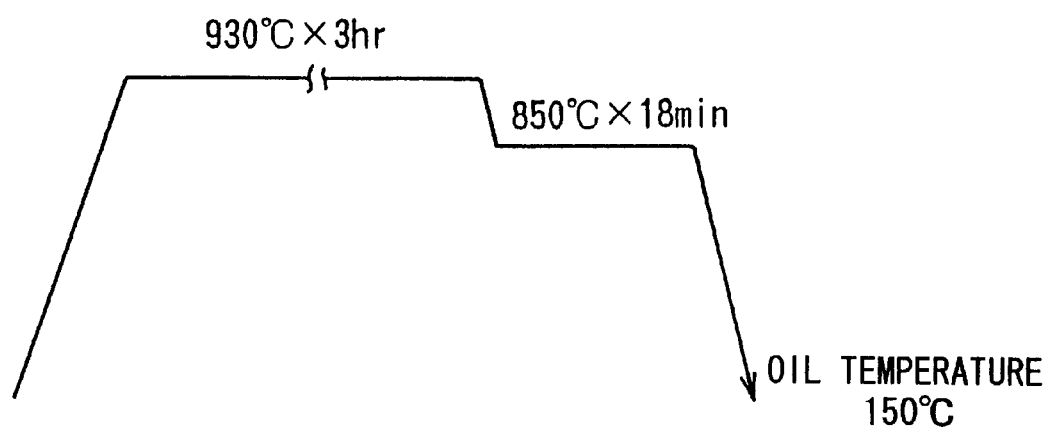
FIG. 3 is a diagram illustrative of conditions for heating a gear.

The gear 18 according to JIS SCr420, which has been cut to form gear teeth, is case-hardened under heating conditions shown in FIG. 3. The case-hardened gear 18 is then set in a position where it will be processed by the method, and the nozzle orifice 30 of the apparatus 10 is positioned in confronting relation to a root or bottom land 36 of the gear 18 (see FIG. 1).

The high-pressure pump 34 is operated to deliver the water 12 from the surge tank 32 through the nozzle 26 into the mixing chamber 28, which is also supplied with the glass beads 14 from the hopper 14. The water 12 and the glass beads 14 are mixed with each other in the mixing chamber 28, and then ejected as the spouted jet 16 from the nozzle orifice 30 toward the root 36 of the gear 18.

In the first embodiment, since the glass beads 14 mixed with the water 12 are ejected, they are oriented to collide accurately with a desired surface of the root 36. Consequently, the glass beads 14 are not scattered, but efficiently ejected toward the root 36.

Figure 2:
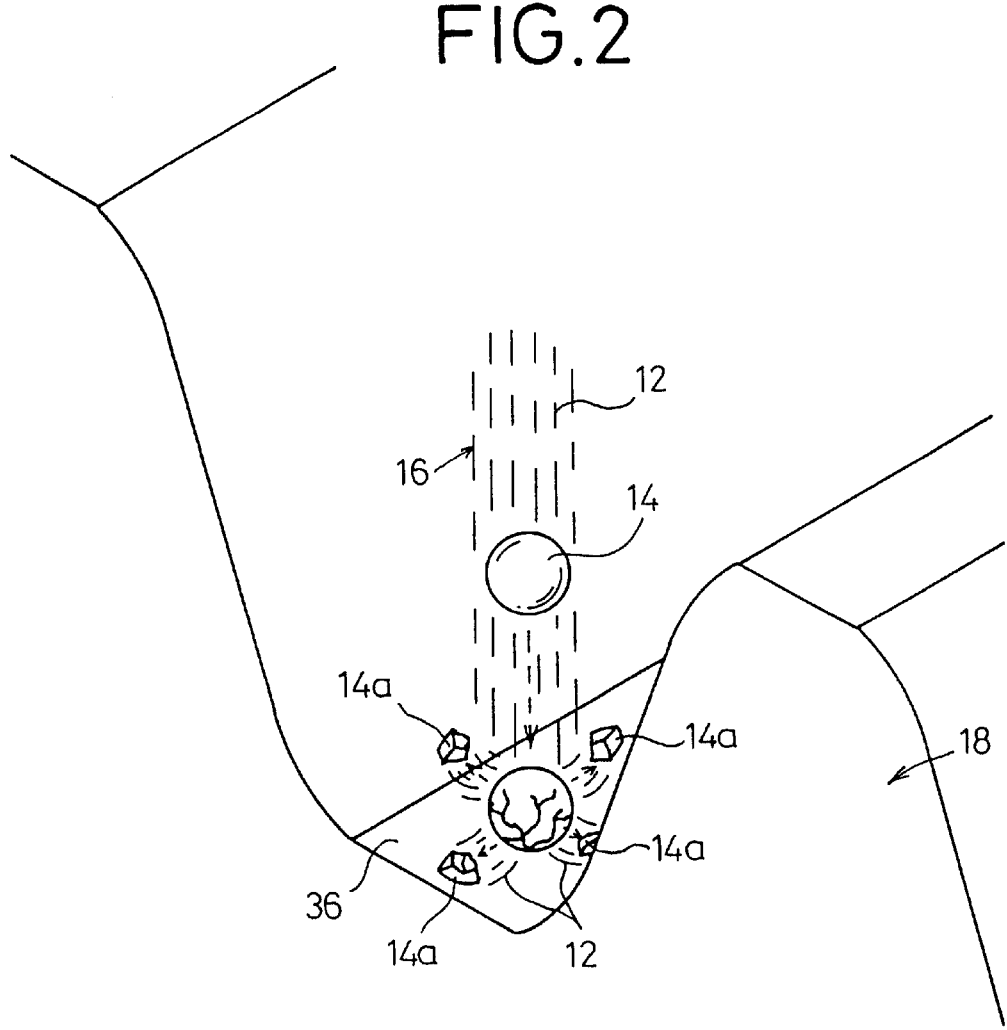
FIG. 2 is a view illustrative of a method of increasing the strength of a metal component with the apparatus according to the first embodiment.

When the glass beads 14 collide with the root 36, they give compressive residual stresses to the surface of the root 36, and also grind the surface of the root 36. Furthermore, as shown in FIG. 2, when the glass beads 14 are broken by the collision with the root 36, broken pieces 14a of the glass beads 14 are pressed against the surface of the root 36 by the water 12 applied to the root 36. Therefore, the broken pieces 14 are effective to grind the surface of the root 36.

The water 12 also collides with the surface of the root 36 as with the glass beads 14. Consequently, the water 12 gives compressive residual stresses to the surface of the root 36, and grinds the surface of the root 36.

According to the first embodiment, therefore, the water 12 and the glass beads 14 effectively impart compressive residual stresses to the root 36, thus increasing the fatigue strength of the gear 18 thereby to easily and reliably increase the strength of the gear 18. The surface roughness of the root 36 is improved for thereby increasing the accuracy of the gear 18.

According to the first embodiment, furthermore, after the root 36 of the gear 18 that has been cut is case-hardened, the surface of the root 36 is ground by the glass beads 14 and the water 12. Therefore, the gear 18 is processed in its entirety more simply and quickly than conventional processes in which only glass beads are applied to metal components that have been cut to shape.

There were prepared various gears 18 including a gear which was processed to increase its strength with water 12 and glass beads 14 having a diameter of 0.1 mm (Experimental Example 1), a gear which was processed to increase its strength with water 12 and glass beads 14 having a diameter of 0.2 mm (Experimental Example 2), a gear which was not processed to increase its strength (Comparative Example 1), a gear which was processed to increase its strength with only water 12 (Comparative Example 2), and a gear which was processed to increase its strength with only glass beads 14 having a diameter of 0.6 mm (Comparative Example 3). These gears 18 were then measured for bending fatigue strength at the roots.

As shown in FIG. 4, specific conditions for increasing the strength of the gears were that the nozzle 26 had a diameter of 0.2 mm, the nozzle orifice 30 had a diameter of 1 mm, the distance between the nozzle orifice 30 and a top land of the gear 18 was 50 mm, the water 12 was ejected at a pressure of 2000 kg/cm$^2$, the glass beads 16 were delivered at a rate of 50 g/min., and the ejection mechanism 20 was moved 1 mm across the gear 18 per cycle of its reciprocating movement at a speed of 2 m/min. laterally with respect to the gear 18.

The gears 18 according to Experimental Examples 1, 2 and Comparative Examples 1~3 were set in a hydraulic fatigue testing machine (not shown), and vibrated at a frequency of 30 Hz to apply stresses to the roots of the gears 18. The results of the experiment are shown in FIG. 5.

The gear which was processed to increase its strength with only water 12 (Comparative Example 2) had no greater increase in the strength than the gear according to Comparative Example 1, and the gear which was processed to increase its strength with only glass beads 14 (Comparative Example 3) had only a slightly greater increase in the strength than the gear according to Comparative Example 1. The gears according to Experimental Examples 1, 2, however, had their strength increased about 37% in low cycles and 50% or more in high cycles compared with the unprocessed gear (Comparative Example 1).

Under the conditions shown in FIG. 4, an experiment was conducted to detect the relations between the diameter of the glass beads 14, the fatigue strength, and the surface roughness. The relation between the diameter of the glass beads 14 and the fatigue strength is shown in FIG. 6, and the relation between the diameter of the glass beads 14 and the surface roughness is shown in FIG. 7.

As shown in FIG. 6, when the diameter of the glass beads 14 was 0.05 mm or less, the glass beads 14 absorbed moisture and hence clogged the pipe, failing to perform the process of increasing the strength of the gear. As shown in FIG. 7, when the diameter of the glass beads 14 was 0.3 mm or greater, the surface roughness increased out of a standard range of 3 $\mu$m.

Another experiment was conducted to detect the relationship between the jet pressure of the water 12 and the fatigue strength. FIG. 8 shows the result of the experiment. When the jet pressure of the water 12 was 98 MPa or less, it had no prominent effect on the strength of the material of the gear.

Figure 9:
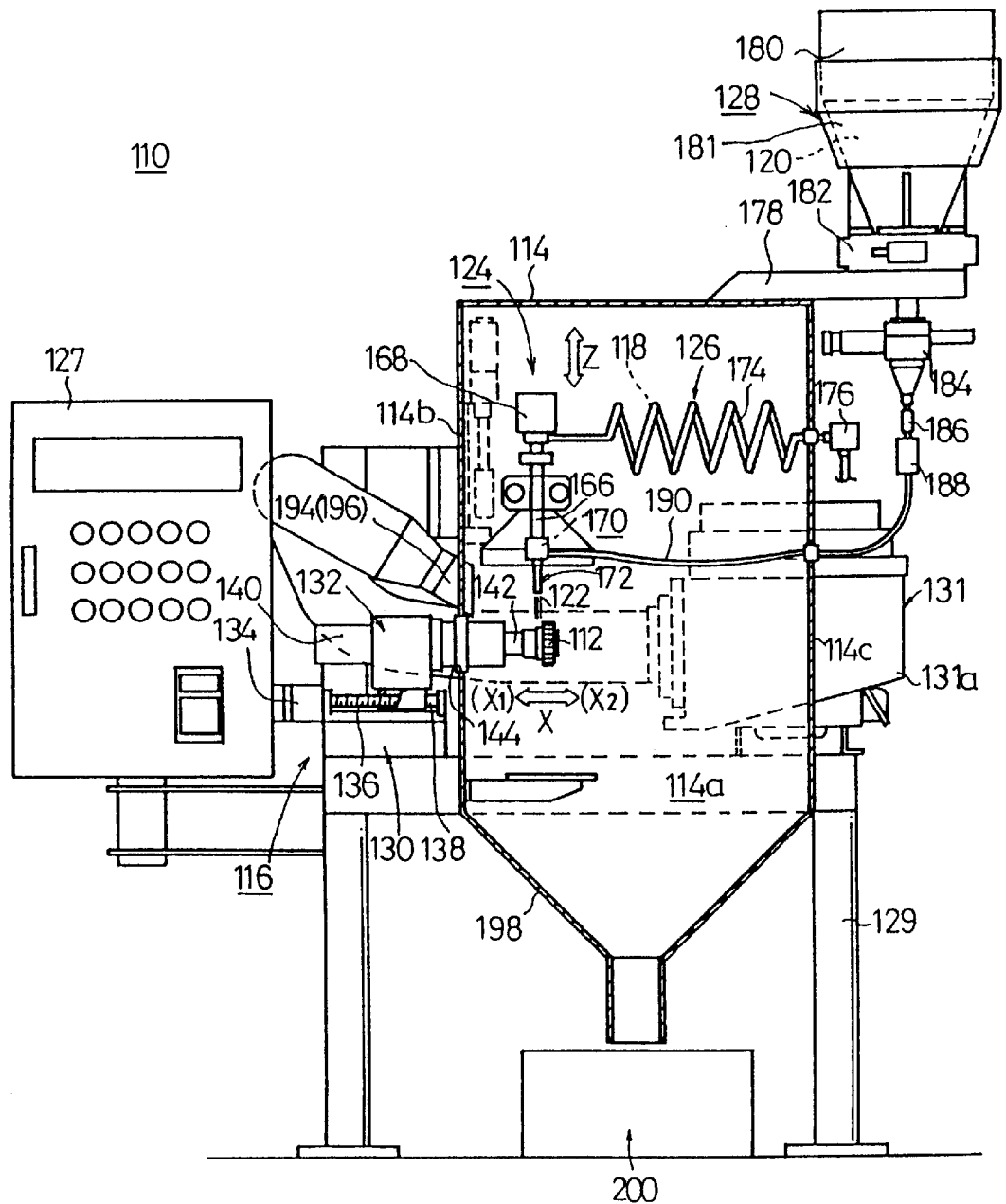
FIG. 9 is a front elevational view, partly in cross section, of an apparatus for increasing the strength of a metal component according to a second embodiment of the present invention.
Figure 10:
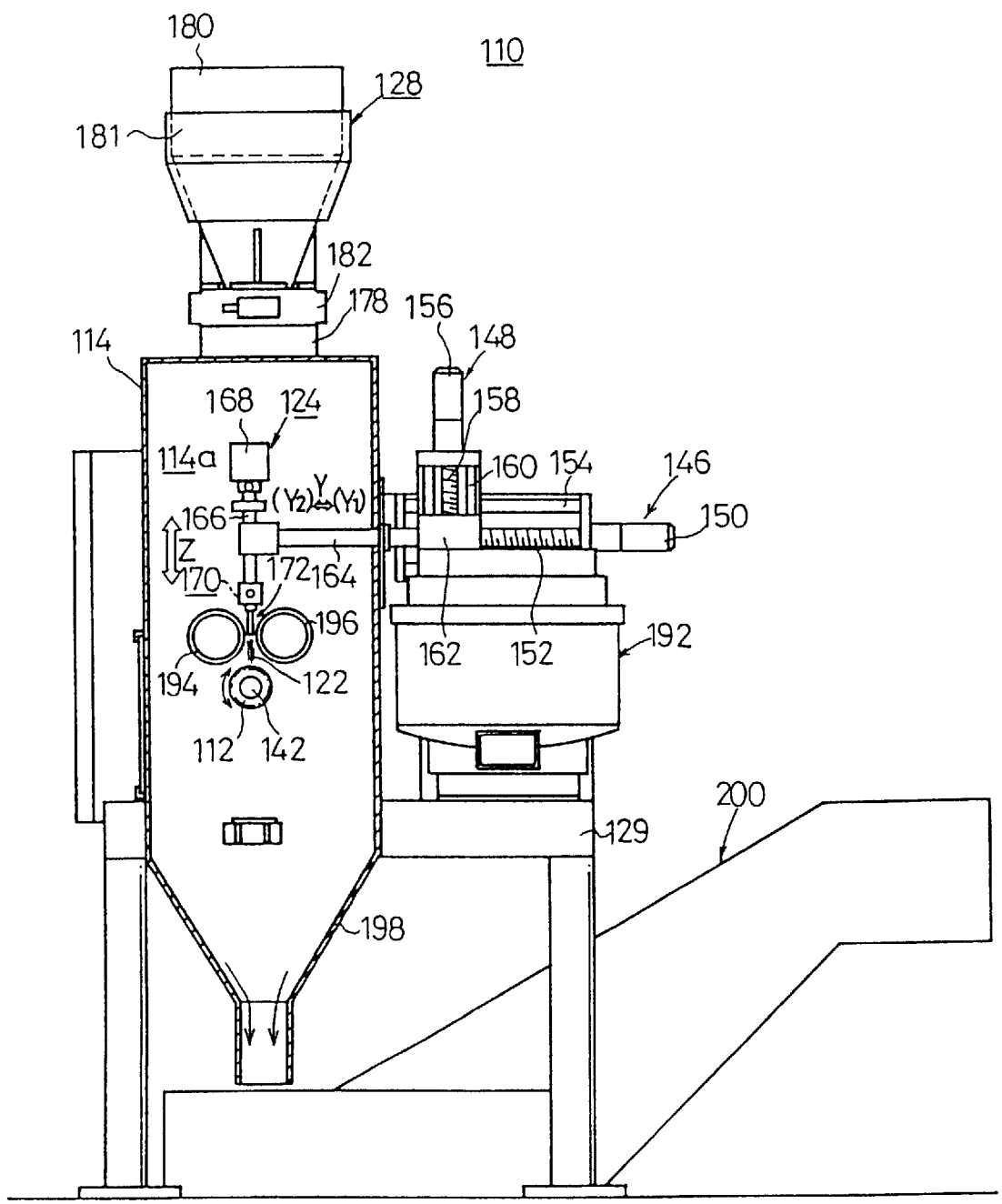
FIG. 10 is a side elevational view, partly in cross section, of the apparatus according to the second embodiment.

FIG. 9 is a front elevational view, partly in cross section, of an apparatus 110 for increasing the strength of a metal component according to a second embodiment of the present invention. FIG. 10 is a side elevational view, partly in cross section, of the apparatus 110.

The apparatus 110 comprises a gear holding mechanism 116 for holding a gear 112 as a workpiece and positioning the gear 112 in a processing chamber 114a in a casing 114, an ejection mechanism 124 for applying a spouted jet 122 of a liquid such as water 118 and glass beads 120 to the gear 112, a water supply mechanism (liquid supply mechanism) 126 for supplying the water 118 under pressure to the ejection mechanism 124, a glass bead supply mechanism 128 for delivering the glass beads 120 at a predetermined rate to the ejection mechanism 124, a mist collecting mechanism 131 for attracting and collecting particulate dust 120b produced when the glass beads 120 are crushed by the surface of the gear 112, and a control console 127 for controlling operation of these mechanisms.

As shown in FIG. 9, the gear holding mechanism 116 is positioned on one side of the chamber 114a remotely from the water supply mechanism 126 and the glass bead supply mechanism 128. The gear holding mechanism 116 has an X-axis slide unit 130 and a spindle unit 132 which are mounted on a base 129. The X-axis slide unit 130 has an X-axis motor 134 connected to a ball screw 136 which is associated with a pair of guide bars 138 extending parallel thereto. The spindle unit 132 is supported on the ball screw 136 and the guide bars 138 for back-and-forth movement in the directions indicated by the arrows X.

The spindle unit 132 has a spindle 142 coupled to a spindle motor 140, with the gear 112 being mounted on a distal end of the spindle 142. The spindle unit 132 has a distal end portion, which includes the spindle 142, movable into the casing 114 through an opening 144 which is defined in a side wall 114b of the casing 114.

As shown in FIG. 10, the ejection mechanism 124 comprises a Y-axis slide unit (first slide unit) 146 and a Z-axis slide unit (second slide unit) 148, which serve as displacing means. The Y-axis slide unit 146 has a horizontal Y-axis motor 150 connected to a horizontal ball screw 152 which is associated with a pair of guide bars 154 extending parallel thereto. The Z-axis slide unit 146 is supported on the ball screw 152 and the guide bars 154 for back-and-forth movement in the directions indicated by the arrows Y. The Z-axis slide unit 148 has a vertical Z-axis motor 156 connected to a vertical ball screw 158 which is associated with a pair of guide bars 160 extending parallel thereto. A movable body 162 is supported on the ball screw 158 and the guide bars 160 for back-and-forth movement in the directions indicated by the arrows Z.

A pipe 166 extending in the directions indicated by the arrows Z is mounted on tip ends of a pair of support rods 164 which extends from the movable body 162 in the directions indicated by the arrows Y. The pipe 166 supports on its upper end an on/off valve 168 for turning on and off the introduction of the water 118. A mixing chamber 170 for mixing the glass beads 120 with the water 118 is connected to a lower end of the pipe 166, and a nozzle 172 is connected to a lower end of the mixing chamber 170.

The water supply mechanism 126 has a water pipe 174 with one end joined to an inlet port of the on/off valve 168. The water pipe 174 is spirally coiled in the chamber 114 and has an opposite end connected through a joint 176 to another side wall 114c (see FIG. 9). To the joint 176, there is connected a high-pressure pump (not shown) for ejecting the spouted jet 122 under a predetermined pressure to the gear 112 from the nozzle 172.

The glass bead supply mechanism 128 comprises a hopper 180 mounted on an upper surface of the casing 114 by an attachment base 178. A band heater 181, serving as means for drying glass beads, is disposed around the hopper 180 for preventing the glass beads 120 stored in the hopper 180 from sticking together by moisture.

A load cell 182 for detecting the remaining quantity of glass beads 120 in the hopper 180 is disposed underneath the hopper 180. As shown in FIG. 9, the hopper 180 has an outlet port connected to a metering valve 184, a negative pressure meter 186, and a laser flowmeter 188 which are successively arranged downwardly. A pipe 190 has an end connected to the laser flowmeter 180 and an opposite end inserted into the chamber 114a and connected to the mixing chamber 170. The glass beads 120 filled in the hopper 180 have diameters ranging from 0.05 mm to 0.3 mm.

Figure 11:
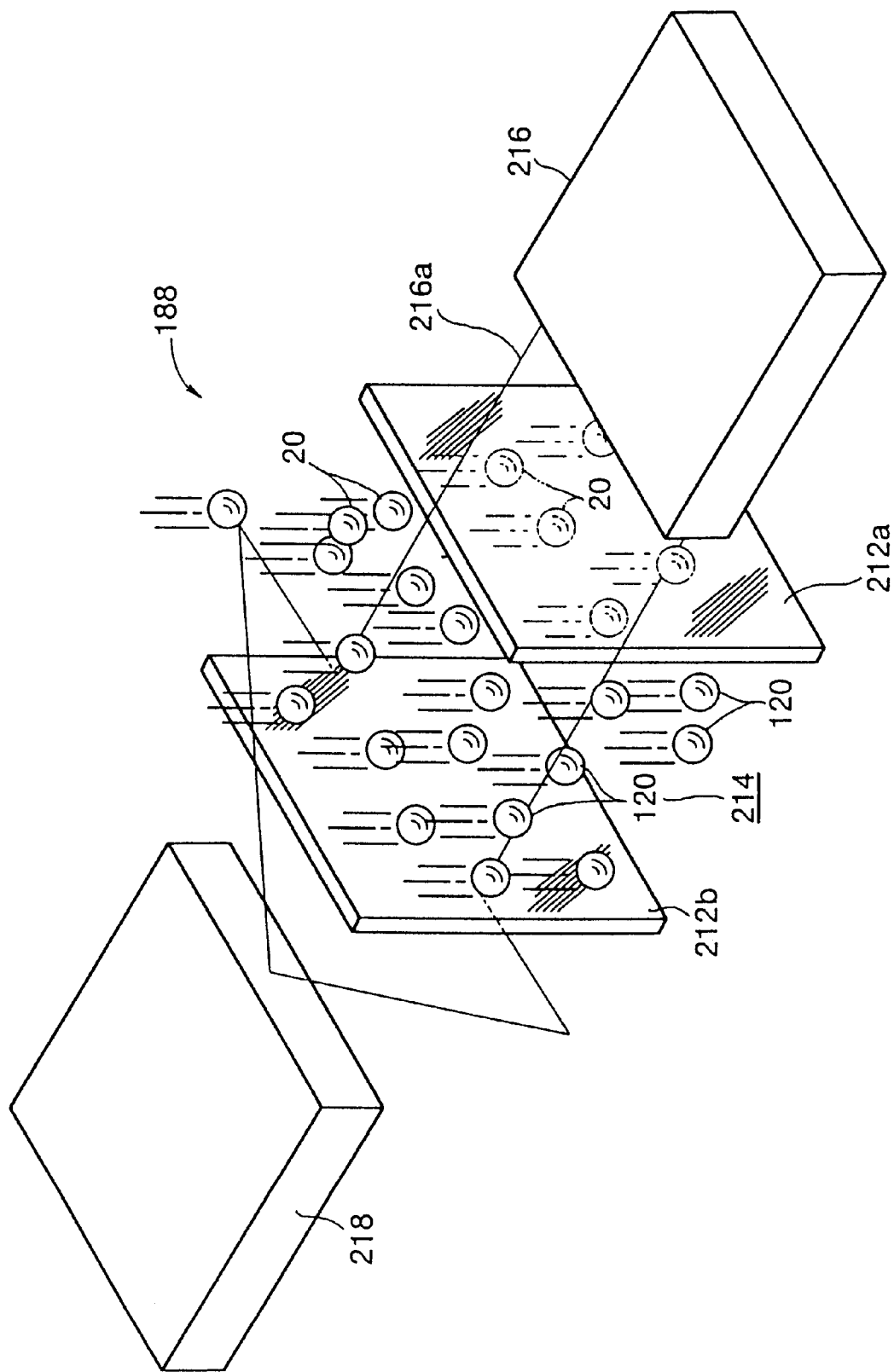
FIG. 11 is a perspective view of a laser flowmeter of the apparatus according to the second embodiment.

As shown in FIG. 11, the laser flowmeter 188 has two spaced vertical transparent plates 212a, 212b such as of glass or the like which are disposed in confronting relation to each other with a space 214 defined therebetween for passing the glass beads 120 therebetween. A laser beam source 126 is disposed on one side of the transparent plate 212a remotely from the transparent plate 212b for applying a laser beam 216a fully across the transparent plate 212a. A laser beam detector 218 is disposed on one side of the transparent plate 212b remotely from the transparent plate 212a for detecting the laser beam 216a.

The mist collecting mechanism 131 has a main housing 131a mounted on the base 129. The main housing 131a houses a negative pressure source (not shown) connected to a pair of ducts 194, 196 having distal ends inserted through the side wall 114b of the casing 114 into the chamber 114a. The distal ends of the ducts 194, 196 have respective first and second openings (suction ports) 194a, 196a which open between the gear 112 and the nozzle 172 closely to the gear 112 (see FIG. 10).

The casing 114 has a lower end portion tapered downwardly into a conical portion 194, and a drain discharge conveyor 200 is disposed below a lower opening of the conical portion 194.

Operation of the apparatus 110 according to the second embodiment will be described below.

The gear 112, which has been cut to form gear teeth, is case-hardened. The case-hardened gear 112 is then set on the spindle 142 of the gear holding mechanism 116, and the nozzle 172 of the ejection mechanism 124 is positionally adjusted selectively in the directions indicated by the arrows Y, Z by the Y-axis slide unit 146 and the Z-axis slide unit 148 so as to confront the gear 112.

The spindle motor 140 is operated to rotate the spindle 142 and the gear 112 in unison with each other, and the X-axis motor 134 of the X-axis slide unit 130 is operated to move the gear 112 in unison with the spindle unit 132 in the direction indicated by the arrow X1 (see FIG. 9).

The ejection mechanism 124 is operated, and the high-pressure pump (not shown) is actuated to deliver the water 118 through the water pipe 174 into the mixing chamber 170. The metering valve 184 of the glass bead supply mechanism 128 is operated to supply a predetermined quantity of glass beads 120 from the pipe 190 into the mixing chamber 170. When the water 118 is ejected from the nozzle 172, a negative pressure is developed in the mixing chamber 170, causing the glass beads 190 in the pipe 190 to be mixed with the water 118 thereby to produce a spouted jet 122 that is ejected from the nozzle 172 to the gear 112.

Figure 12A:
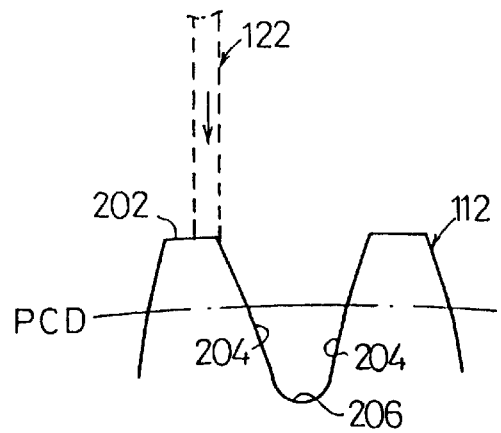
FIG. 12A is a view showing the manner in which the top land of a gear tooth is processed.
Figure 12B:
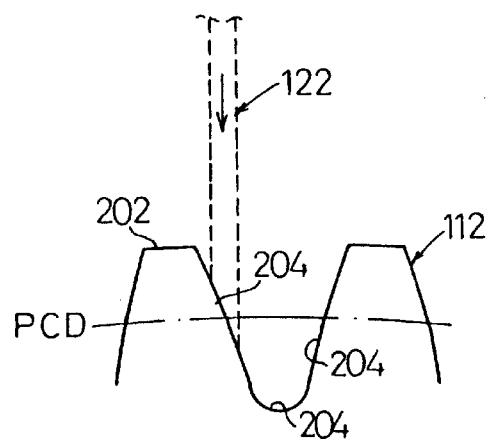
FIG. 12B is a view showing the manner in which a flank of a gear tooth is processed.
Figure 12C:
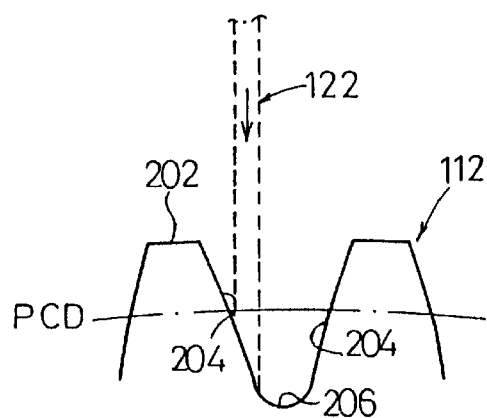
FIG. 12C is a view showing the manner in which a root of a gear is processed.

While the gear 112 is making one revolution, the gear 112 is displaced a distance equal to or less than the diameter of the orifice opening of the nozzle 172, in the direction indicated by the arrow X1, i.e., in the transverse direction of the gear 112. Therefore, the spouted jet 122 of the water 118 and the glass beads 120 is oriented into accurate and uniform collision with desired positions of a top land 202, a tooth flank 204, and a root 206 of the gear 112 (see FIGS. 12A through 12C).

In this embodiment, the gear 112 has a module of 1.5, a helix angle of 36°, a pressure angle of 17.5°, and 52 teeth, and the spouted jet 122 is ejected to a portion of a tooth flank 204 which corresponds to the pitch circle diameter (PCD). The spouted jet 122 can reliably be applied to the tooth flank 204 and the root 206 to impart sufficient compressive residual stresses to the tooth flank 204 and the root 206.

Figure 13:
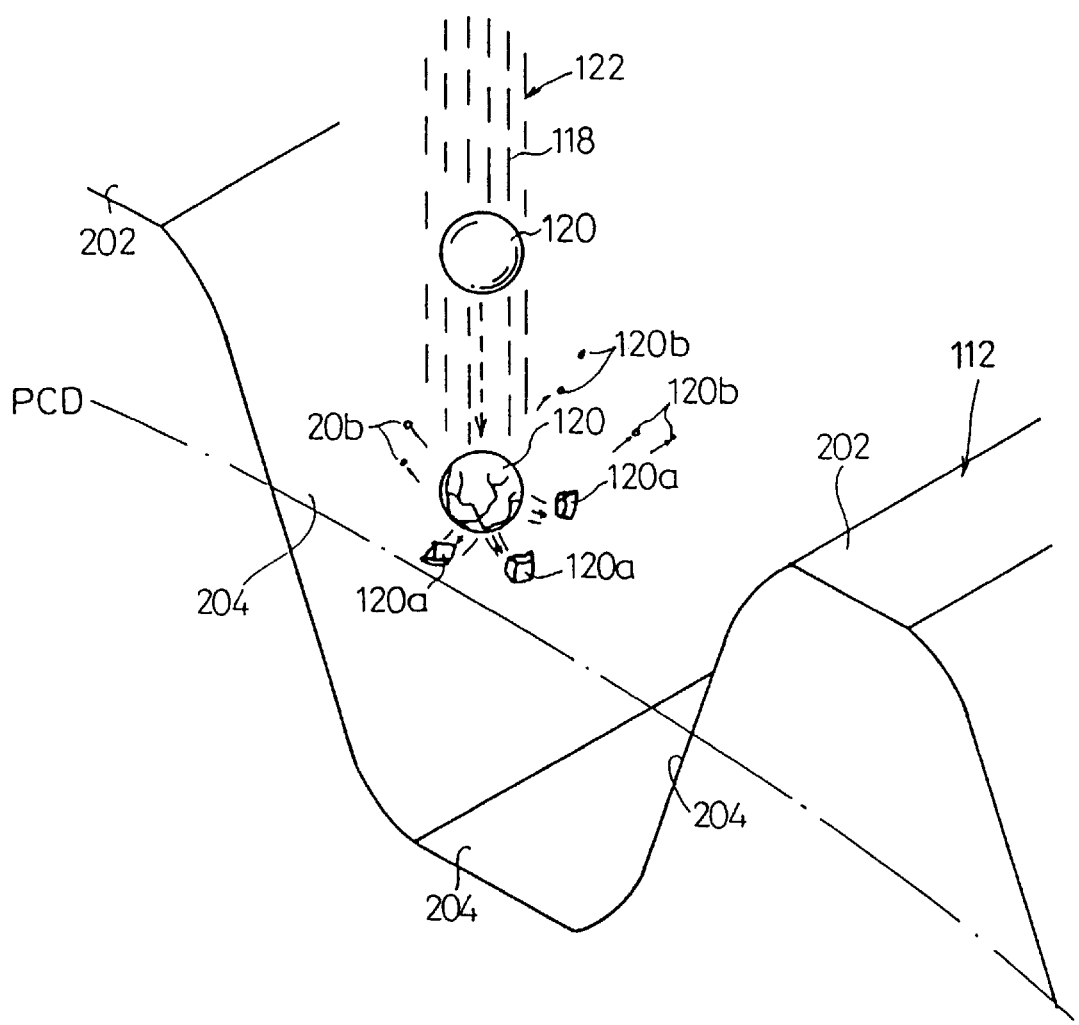
FIG. 13 is a view showing the manner in which a glass bead collides with a flank of a gear tooth.

Furthermore, as shown in FIG. 13, when a glass bead 120 collides with a tooth flank 204 of the gear 112, the surface of the tooth flank 204 is given compressive residual stresses and ground by the glass bead 120, and the glass bead 120 is crushed. At this time, broken pieces of the glass bead 120 are pressed at acute angles against the surface of the tooth flank 204 by the water 118 which is ejected to the tooth flank 204. The gear 112 is therefore ground in an area ranging from the portion of the tooth flank 204 which corresponds to the pitch circle diameter (PCD) to the root 206, so that the area is reliably finished into a smooth surface.

As shown in FIG. 9, the gear holding mechanism 116 is positioned on one side of the chamber 114a remotely from the water supply mechanism 126 and the glass bead supply mechanism 128. Accordingly, the gear holding mechanism 116, the water supply mechanism 126, and the glass bead supply mechanism 128 do not interfere with each other, and the apparatus 110 may easily be reduced in size in its entirety.

Figure 14A:
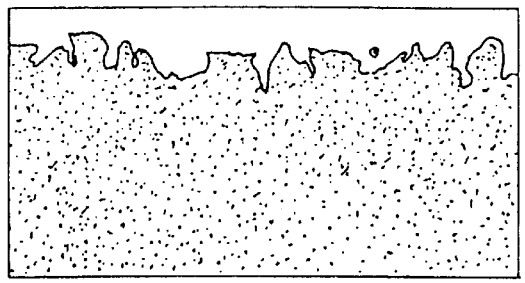
FIG. 14A is an enlarged view of a tooth flank at the pitch circle after the gear was case-hardened by the apparatus according to the second embodiment.
Figure 14B:
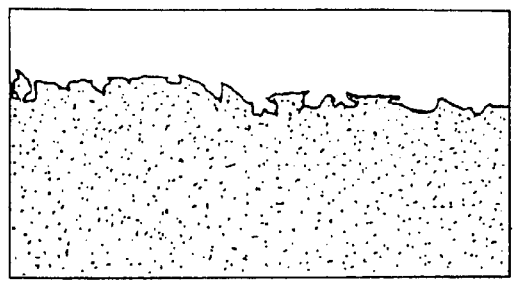
FIG. 14B is an enlarged view of the tooth flank at the pitch circle which was processed for increased strength by the apparatus according to the second embodiment.
Figure 15A:
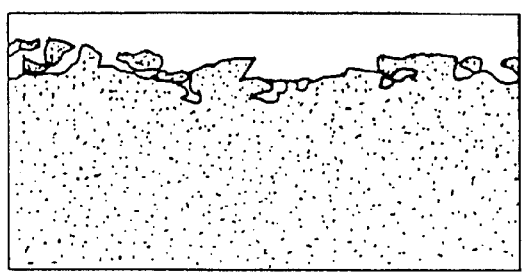
FIG. 15A is an enlarged view of a gear root after the gear was case-hardened by the apparatus according to the second embodiment.
Figure 15B:
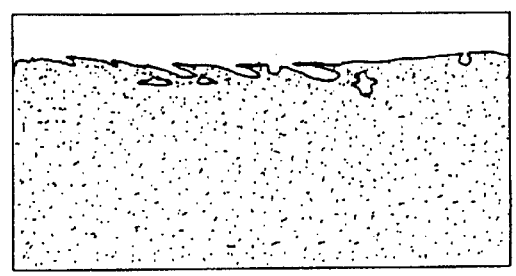
FIG. 15B is an enlarged view of the gear root which was processed for increased strength by the apparatus according to the second embodiment.

FIG. 14A is an enlarged view of the tooth flank 204 after the gear 112 was case-hardened. FIG. 14B is an enlarged view of the tooth flank 204 after the gear 112 was processed for increasing its strength by the apparatus 110. FIG. 15A is an enlarged view of a gear root after the gear was case-hardened, and FIG. 15B is an enlarged view of the gear root which was processed for increasing its strength by the apparatus 110. It can be seen that an oxide layer was effectively removed from the surfaces of the tooth flank 204 and the root and these surfaces were smoothed by the process of increasing the strength.

After gears 112 were processed to increase their strength by the spouted jet 122 which was ejected at various angles (ejection angles) to the portion of the tooth flank 204 corresponding to the pitch circle diameter, the gears 112 were measured for compressive residual stresses and surface roughness. The results are shown in FIG. 16.

When the ejection angle was 30° or greater, the surface of the tooth flank 204 was roughened, and when the ejection angle was 10° or smaller, no sufficient compressive residual stresses were imparted. Therefore, it was found out that the ejection angle of the spouted jet 122 should preferably be in the range from 10° to 30°.

Figure 17:
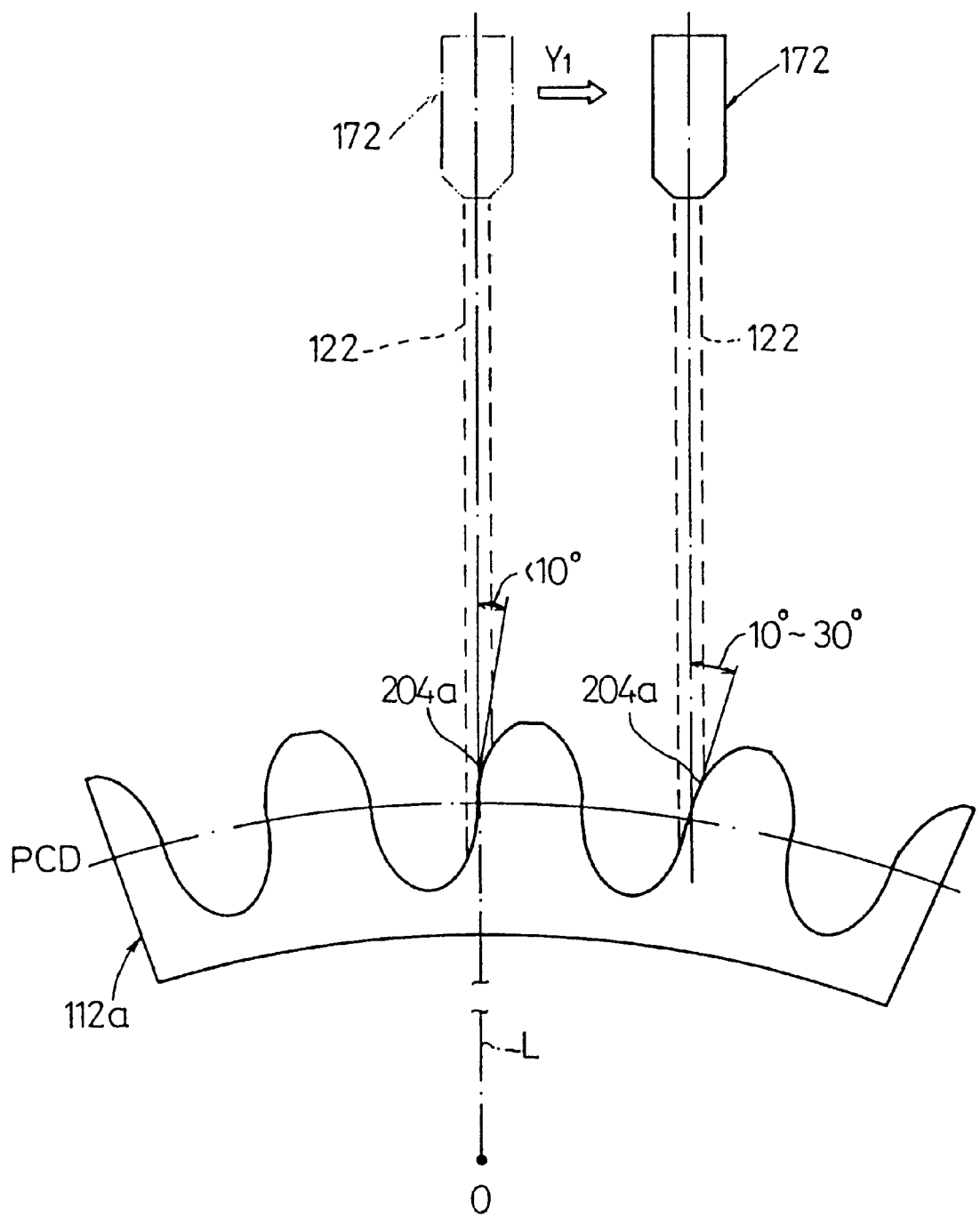
FIG. 17 is a view of a nozzle which is offset in the apparatus according to the second embodiment.

As shown in FIG. 17, a gear 112a whose tooth flank 204a has a small pressure angle can easily be processed for its strength by translating (offsetting) the nozzle 172. Specifically, if the ejection angle of the spouted jet 122 is 10° or less at the portion corresponding the pitch circle diameter while the nozzle 172 is positioned on a straight line L interconnecting the axis of the nozzle 172 and the center O of the gear 112a, then it is impossible to impart sufficient compressive residual stresses.

To solve the above problem, as shown in FIG. 10, the Y-axis motor 150 of the Y-axis slide unit 146 is operated to translate the movable body 162 a predetermined distance (a distance determined depending on the pressure angle of the gear 112a) in the direction indicated by the arrow Y1. The nozzle 172 is positioned such that the ejection angle of the spouted jet 122 with respect to the tooth flank 204a of the gear 112a falls in the range from 10° to 30°. Then, the gear 112a is processed to increase its strength. Therefore, the apparatus is able to easily process various different gears 112, 112a, and is highly versatile.

The nozzle 172 can be offset symmetrically laterally with respect to the straight line L interconnecting the axis of the nozzle 172 and the center O of the gear 112a (112). When the gear 112a (112) is rotated in opposite directions, the spouted jet 122 can be applied to the tooth flank 204a (204) of the gear 112a (112) to efficiently process the tooth flank 204a (204) for increasing its strength.

There were prepared gears 112b, 112c having specifications shown in Table 1 and manufactured from a material JIS SCM420, and the gears 112b, 112c were case-hardened. The number of revolutions for the gear 112b was set to 28, and the number of revolutions for the gear 112c was set to 23, and the gears 112b, 112c were processed to increase their strength under conditions shown in Table 2. The ejection angle with respect to the tooth flank of the gear 112b was set to 18°, the ejection angle with respect to the tooth flank of the gear 112c was set to 19°, and the ejection angles with respect to the roots of the gears 112b, 112c were set to 45° and 40°, respectively.

The glass beads 120 was composed of 72 wt % of $SiO_2$, 2 wt % of $AlO_3$, 13.5 wt % of $Na_2O$ and $K_2O$, 3.5 wt % of MgO, and 9 wt % of CaO.

TABLE 1

|  | Gear 112b | Gear 112c |
| --- | --- | --- |
| Module | 1.5 | 1.5 |
| Pressure angle | 17.5° | 17.5° |
| Helix angle | 36° | 36° |
| Number of teeth | 36 | 44 |
| Width of teeth | 13 mm | 12 mm |

TABLE 2

| Diameter of glass beads | φ 0.09~0.14 mm |
| --- | --- |
| Feed speed of nozzle | 7 mm/min. |
| Delivery rate of glass beads | 50 g/min. |
| Water pressure (flow rate) | 196 MPa (630 m/sec.) |
| Nozzle diameter | 40/100 inch |

Figure 18:
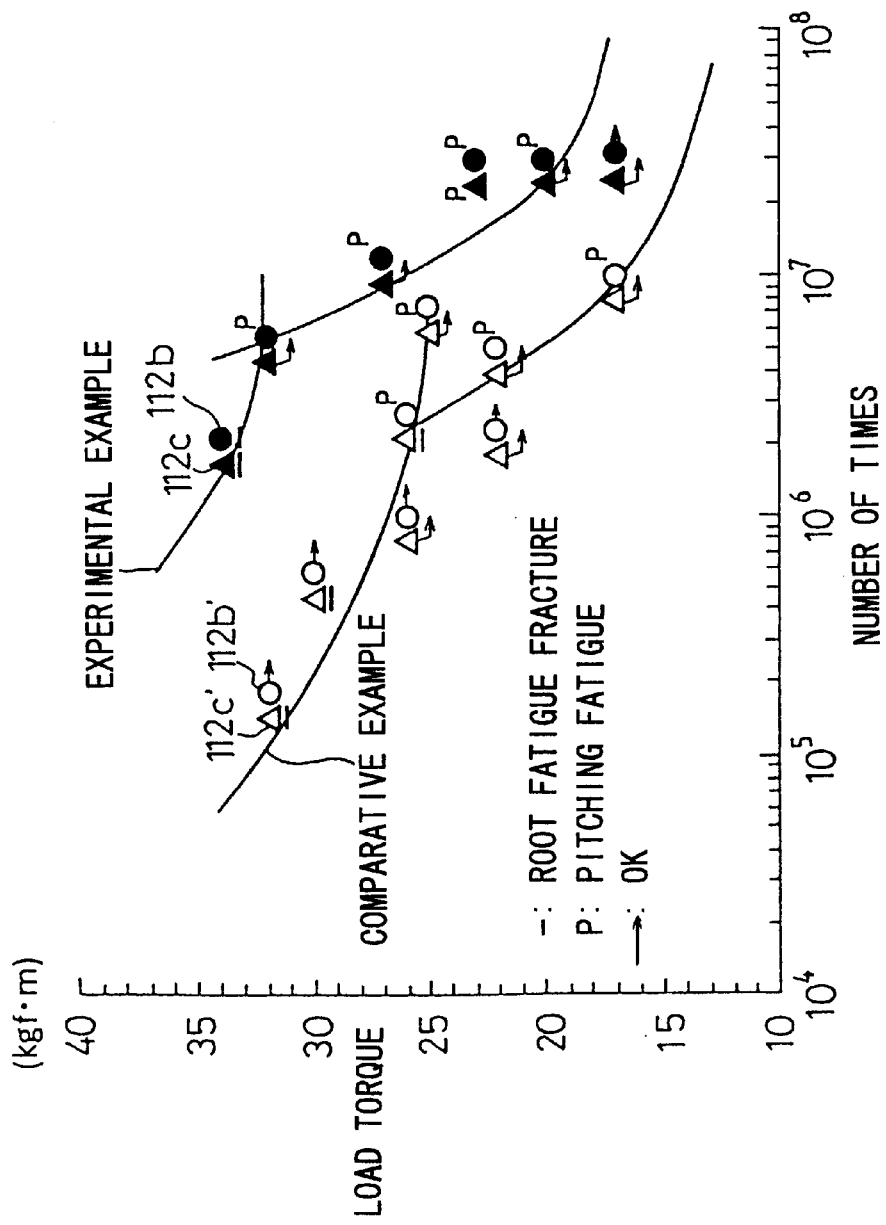
FIG. 18 is a diagram showing load torques of a gear which has been processed for increased strength and a gear which has not been processed for increased strength.

The gears 112b, 112c (Experimental Example) which were processed to increase their strength and gears 112b', 112c' (Comparative Example) which were only case-hardened were combined with each other and rotated under predetermined torques, and confirmed for their root strength and flank strength. The results are shown in Table 3 and FIG. 18.

TABLE 3

|  | Root strength ($10^7$ times) | Flank strength ($10^8$ times) |
| --- | --- | --- |
| Processed | 32 kgfm | 17 kgfm |
| Not processed | 25 kgfm | 13 kgfm |

It can be seen that the gears 112b, 112c which were processed to increase their strength by the spouted jet 122 of the glass beads 120 and the water 118 had their root strength about 28% greater and their flank strength about 31% greater than the gears 112b', 112c' which were only case-hardened.

Figure 19:
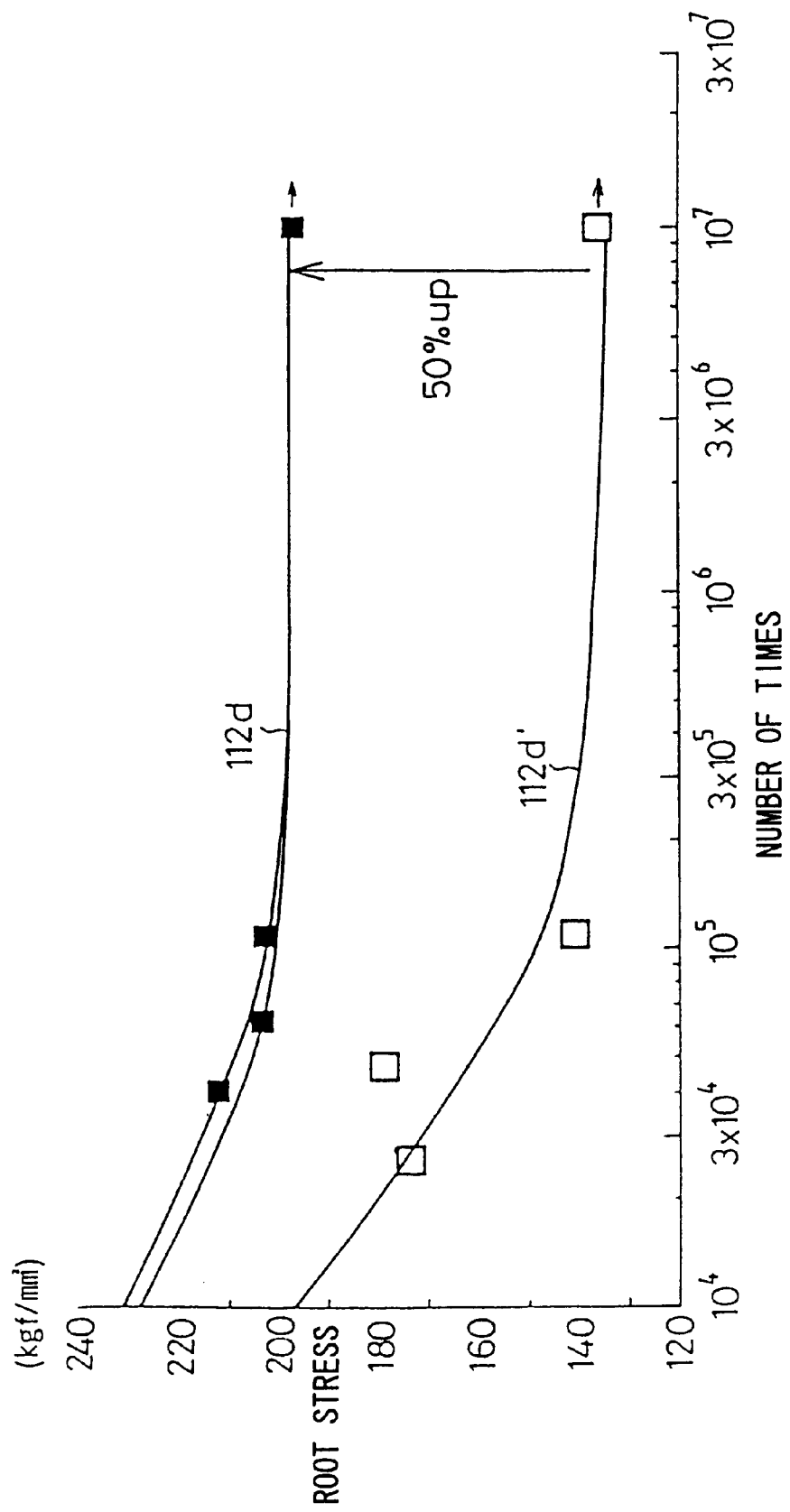
FIG. 19 is a diagram showing root stresses of a gear which has been processed for increased strength and a gear which has not been processed for increased strength.

FIG. 19 shows measured root stresses of a gear 112d made of chrome steel (JIS SCr) and processed to increase its strength by the spouted jet 122 and a gear 112d' made of the same material as the gear 112d and not processed to increase its strength. A study of FIG. 19 indicates that the gear 112d processed to increase its strength by the spouted jet 122 had its root stresses 50% greater than the unprocessed gear 112d'.

Figure 20:
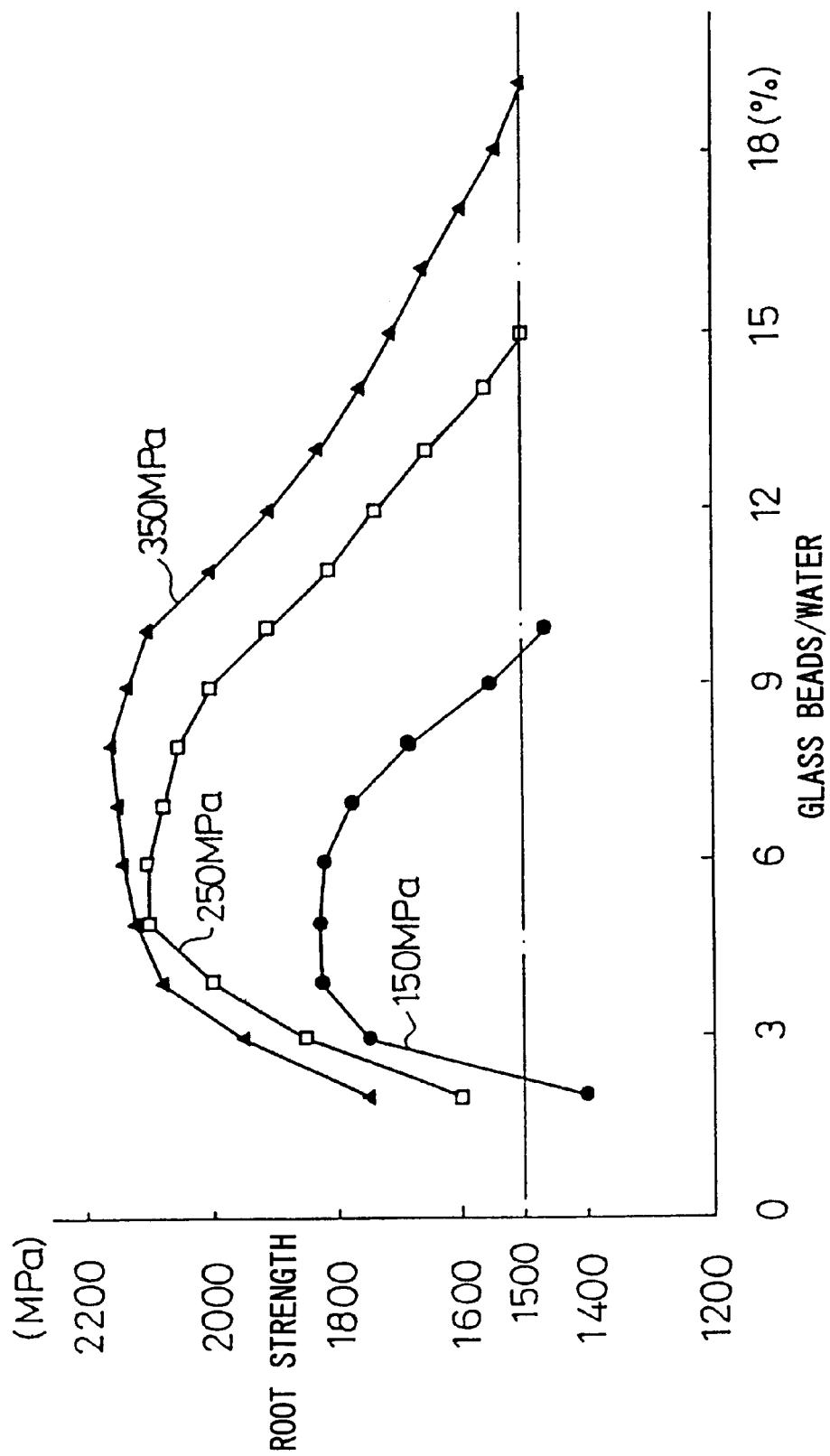
FIG. 20 is a diagram showing the relationship between the ratio of glass beads to water and the root strength under different pressures at which the glass beads are applied.

Spur gears 112 each having a module of 2.5, a pressure angle of 17.5°, 38 teeth, and a tooth width of 8 mm were processed by respective spouted jets 122 of glass beads 120 and water 118 mixed at different ratios, which spouted jets 122 were ejected under different pressures of 150 MPa, 250 MPa, and 350 MPa from the nozzle 172 having a diameter of 0.75 mm to the gears 112. Thereafter, the gears 112 were measured for their root strength. The results are shown in FIG. 20. The root strength was tested by applying root bending stresses while the gears 112 were being sandwiched, vibrating the gears 112 at a frequency of 30 Hz, and determining the fatigue strength at $10^7$ times.

When the quantity of glass beads was less than 2 volume % of the water flow, a desired root strength (1500 MPa) could not be achieved in a certain processing time, but a considerably long time was consumed to process the gears.

When the quantity of glass beads was in excess of 19 volume % of the water flow, the speed of the water 118 was lowered at the time of mixing the glass beads 120 under the negative pressure of the water 118 delivered under pressure in the mixing chamber 170. Therefore, a predetermined amount of energy could not be imparted to the glass beads 120, failing to achieve a desired root strength.

As a consequence, it was found out that the gears 112 can efficiently and sufficiently be processed to increase their strength by setting the quantity of glass beads 120 to a range from 2 volume % to 19 volume % of the water flow. More preferably, the quantity of glass beads 120 should be set to a range from 3 volume % to 10 volume % of the water flow.

Spouted jets 122 containing various different quantities of glass beads were ejected to gears 112 under different pressures of 150 MPa, 250 MPa, and 350 MPa, and the gears 112 were measured for their bending strength and surface roughness. The results are shown in FIGS. 21 and 22.

Figure 21:
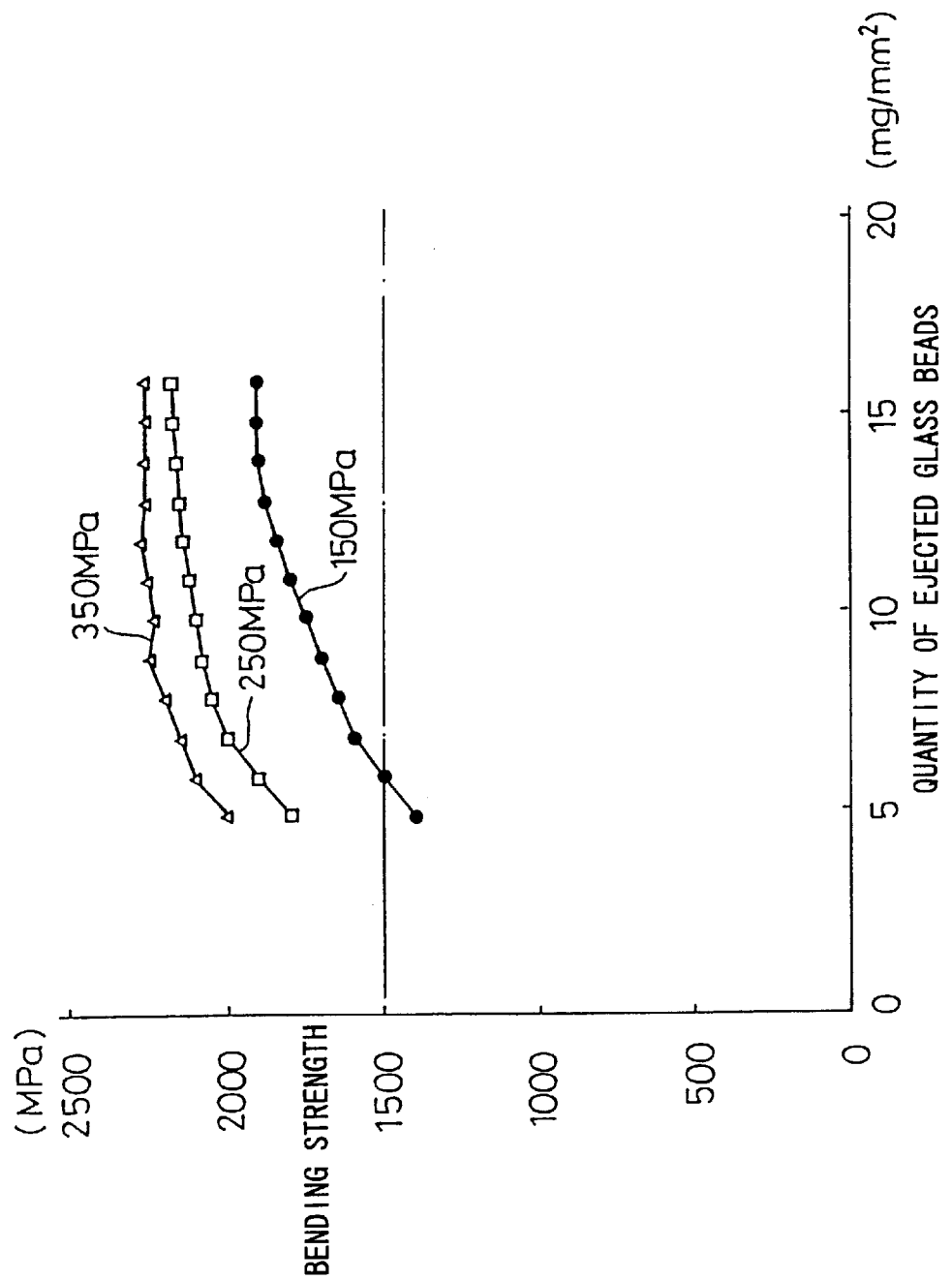
FIG. 21 is a diagram showing the relationship between the amount of applied glass beads and the bending strength under different pressures at which the glass beads are applied.
Figure 22:
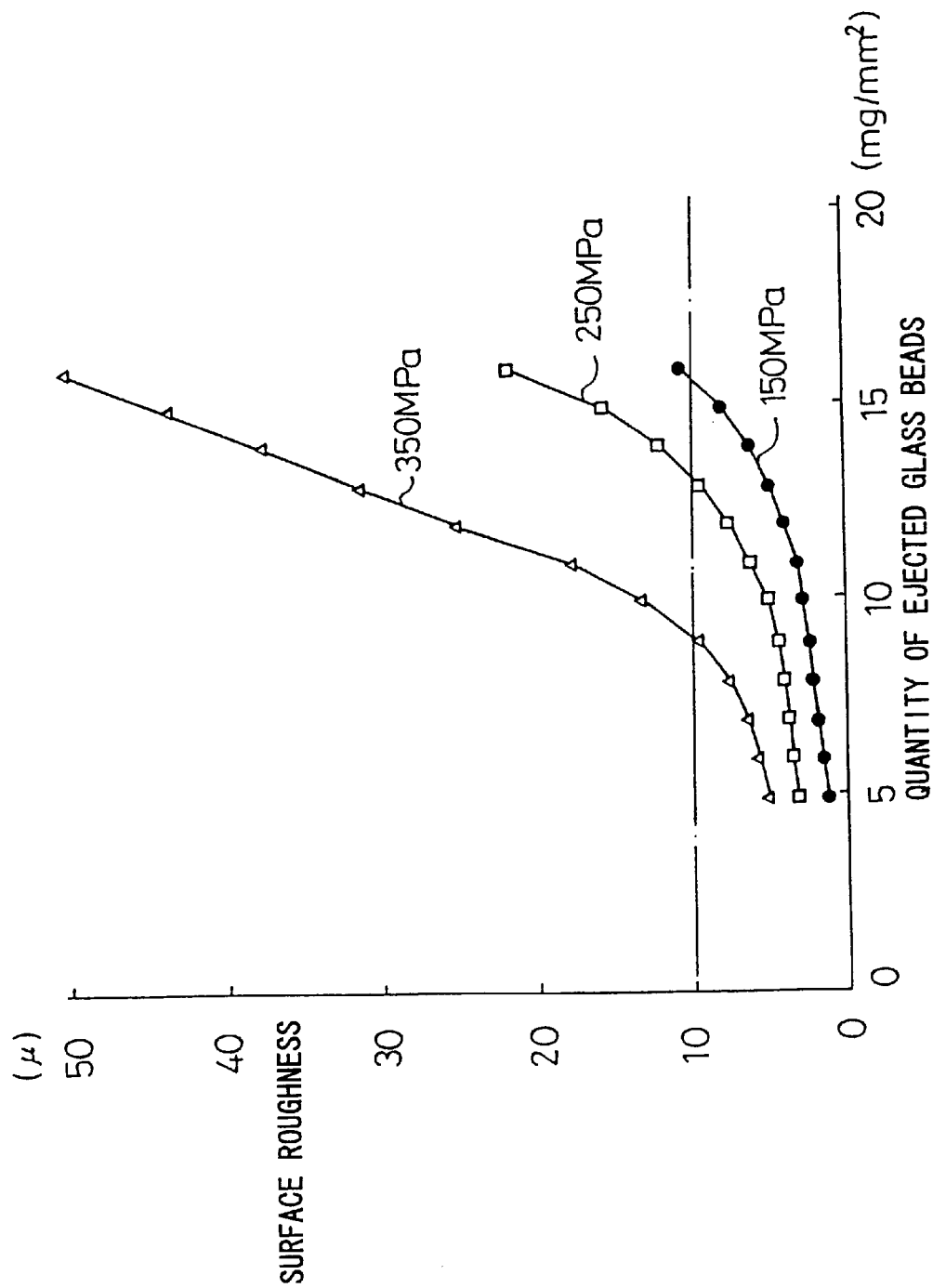
FIG. 22 is a diagram showing the relationship between the amount of applied glass beads and the surface roughness under different pressures at which the glass beads are applied.

As shown in FIG. 21, when the quantity of glass beads 120 was less than 5 mg/cm$^2$, a desired root strength (1500 MPa) could not be achieved. As shown in FIG. 22, when the quantity of glass beads 120 was in excess of 16 mg/mm$^2$, a desired surface roughness (10$\mu$) was not accomplished. It is possible to impart sufficient compressive residual stresses to the gears 112 and produce smooth surfaces thereon by setting the quantity of glass beads 120 to a range from 5 mg/mm$^2$ to 16 mg/mm$^2$. It is more preferable to set the quantity of glass beads 120 to a range from 5 mg/mm$^2$ to 9 mg/mm$^2$.

In the apparatus 110, as shown in FIGS. 9 and 10, the heater 181, serving as means for drying glass beads, is disposed around the hopper 180 of the glass bead supply mechanism 128. The glass beads 120 contained in the hopper 180 are kept at a predetermined temperature, e.g., 40° C. or higher, at all times by the heater 181.

Therefore, moisture which has been absorbed by the glass beads 120 is reliably removed, and the glass beads 120 do not produce a clog. Therefore, even though the glass beads 120 have very small diameters which range from 0.05 mm to 0.3 mm and tend to form a clog due to moisture absorption, the glass beads 120 can stably be supplied from the hopper 180 through the pipe 190 to the ejection mechanism 124.

The apparatus 110 has the laser flowmeter 188 for detecting the rate of glass beads 120 which are delivered from the hopper 180 through the metering valve 184 to the ejection mechanism 124. As shown in FIG. 11, when the glass beads 120 pass through the space 214 between the transparent plates 212a, 212b, the laser beam source 216 emits the laser beam 216a fully across the transparent plates 212a, 212b. When the laser beam 216a is detected as a transmitted beam by the laser beam detector 218, the rate at which the glass beads 120 pass is measured.

Since it is accurately detected whether a predetermined quantity of glass beads 120 has actually been supplied from the hopper 180 through the pipe 190 to the ejection mechanism 124, the glass beads 120 are stably supplied highly reliably.

The pipe 190 has one of its ends connected to the laser flowmeter 188 and the other end connected to the mixing chamber 170. When a negative pressure is developed in the mixing chamber 170 by the water 118 which is delivered under pressure through the water pipe 174 to the ejection mechanism 124, the glass beads 120 in the pipe 190 are drawn into the mixing chamber 170 under the negative pressure and mixed with the water 118, producing a desired spouted jet 122.

If a desired negative pressure is not developed in the pipe 190, then it indicates that a failure has occurred, e.g., a crack has been produced in the pipe 190, or the pipe 190 has been disconnected from the ejection mechanism 124. Therefore, at the time the pressure detected by the negative pressure meter 186 is in an abnormal level, the apparatus 110 is shut off, immediately eliminating the abnormal condition. As a result, the gear 112 can be processed efficiently and stably for increasing its strength.

The water 118 ejected into the chamber 114a and the broken pieces 120a of the glass beads 120 are discharged from the conical portion 198 in the lower portion of the casing 114 into the drain discharge conveyor 200, through which they are collected by an external device. However, Particulate dust 120b (see FIG. 13) produced when the glass beads 120 are crushed is liable to float in the chamber 114a.

In the apparatus 110, the ducts 194, 196 have their distal ends inserted into the chamber 114a and having their respective first and second openings 194a, 196a opening between the gear 112 and the nozzle 172 closely to the gear 112. When the mist collecting mechanism 131 is operated to draw a mist containing the particulate dust 120b through the first and second openings 194a, 196a, the mist containing the particulate dust 120b which floats in the chamber 114a closely to the gear 112 is reliably drawn from the first and second openings 194a, 196a through the ducts 194, 196.

The particulate dust 120b produced when the glass beads 120 are crushed is thus easily and reliably collected by the mist collecting mechanism 131, and is prevented from being attached to the spindle 142, etc. Therefore, the particulate dust 120b is prevented from being attached to the spindle 142, for example, which is rotating at a high speed, and the spindle 142 is prevented from failing to rotate.

Figure 23:
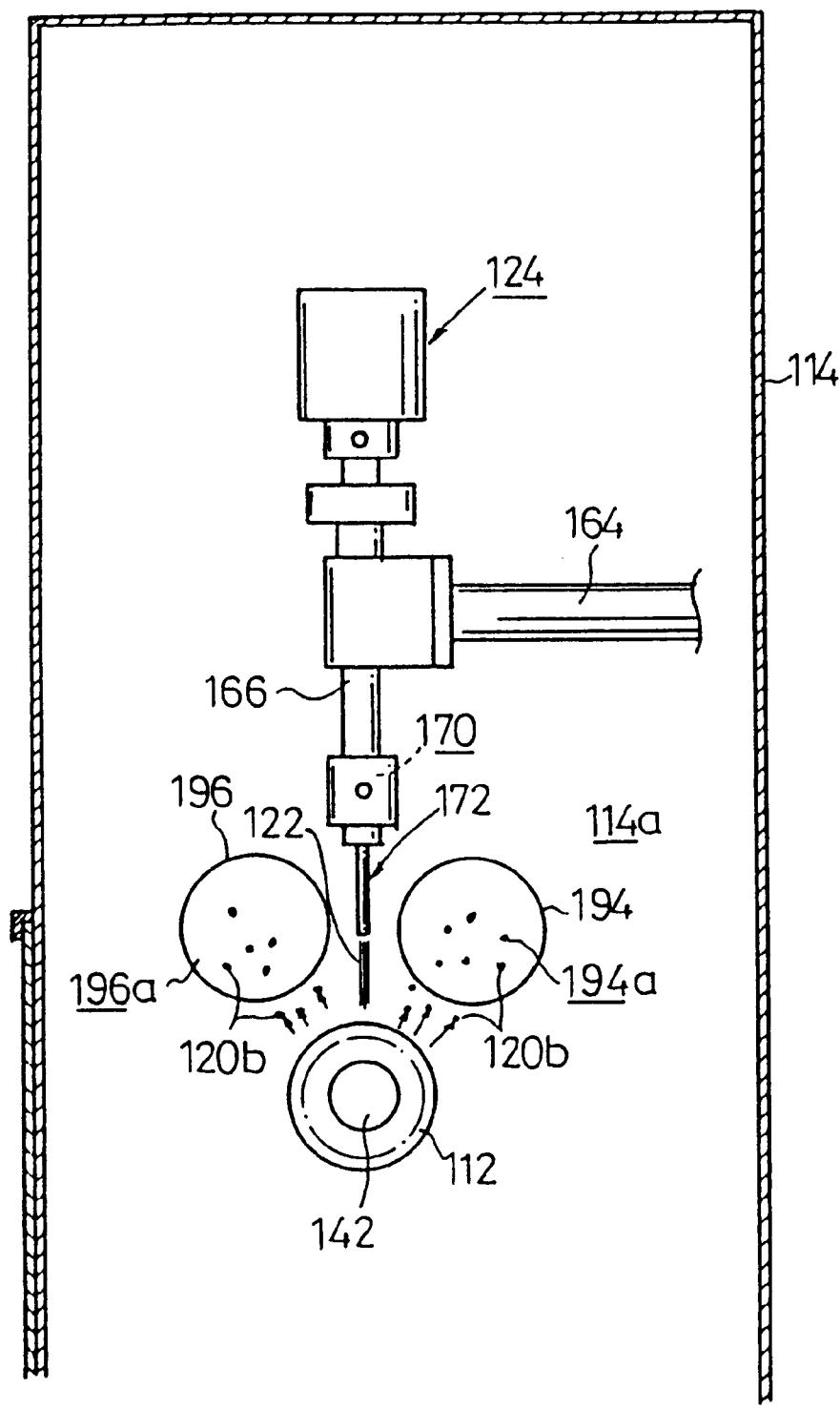
FIG. 23 is an enlarged view of a portion of the apparatus according to the second embodiment, showing the manner in which a mist collecting mechanism operates.

As shown in FIG. 23, the broken pieces 120a produced when the glass beads 120 are crushed tend to be attached to the surface of the gear 112 that has been processed to increase its strength.

To eliminate such a drawback, after the gear 112 has been processed to increase its strength, the X-axis motor 134 of the X-axis slide unit 130 is operated in a direction opposite to the direction described above, moving the spindle unit 132 in the direction indicated by the arrow X2, and the metering valve 184 of the glass bead supply mechanism 128 is closed to stop the supply of glass beads 120 from the hopper 180 to the ejection mechanism 124. The gear 112, after it has been ground, is moved in the direction indicated by the arrow X2 while it is being rotated, and only the water 118 is applied to the gear 112 to wash the broken pieces 120a off the surface of the gear 112.

Consequently, the ejection mechanism 124 functions as a washing mechanism simply when the supply of glass beads 120 from the glass bead supply mechanism 128 is stopped. The process of washing the surface of the ground gear 112 is thus carried out substantially continuously immediately after the process of increasing the strength of the gear 112 is finished. As the washing process is quickly performed, the overall process of increasing the strength of the gear 112 is efficiently and easily carried out.

Glass beads 120 which remain in the pipe 190 are reliably drawn out of the pipe 190 under the negative pressure which is developed when the water 118 is ejected from the nozzle 172. Thus, glass beads 120 are reliably prevented from remaining and forming a clog in the pipe 172.

Figure 24:
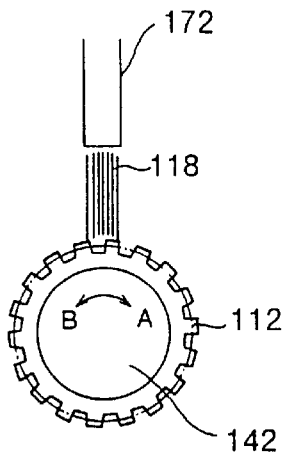
FIG. 24 is a view illustrative of the manner in which a gear is rotated in opposite directions when it is washed.

While the gear 112 is being washed, the gear 112 and/or the nozzle 172 are moved in various directions to improve the ability to wash the gear 112. For example, as shown in FIG. 24, while the gear 112 is rotated in unison with the spindle 142 by the spindle unit 132 alternately in the direction indicated by the arrow A (a normal direction) and the direction indicated by the arrow B (an opposite direction), only the water 118 is ejected from the nozzle 172 to the gear 112.

Figure 25:
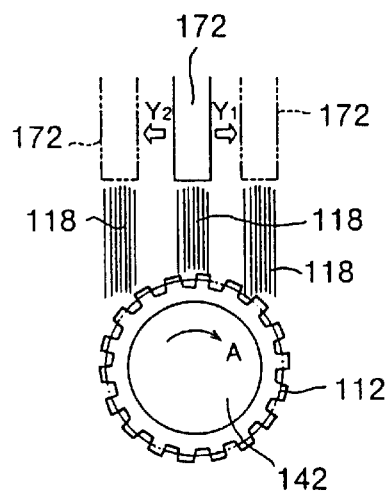
FIG. 25 is a view illustrative of the manner in which a nozzle is moved back and forth horizontally when the gear is washed.

Alternatively, as shown in FIG. 25, while the nozzle 172 is moved in the direction indicated by the arrow Y1 and/or the direction indicated by the arrow Y2 with respect to the gear 112 which is being rotated in unison with the spindle 142 in the direction indicated by the arrow A, only the water 118 is ejected from the nozzle 172 to the gear 112. At this time, the nozzle 172 is moved in the directions indicated by the arrows Y by controlling operation of the Y-axis slide unit 146.

Figure 26:
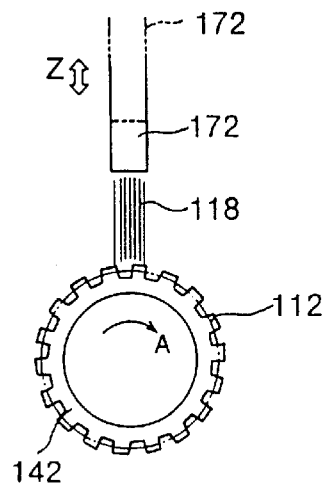
FIG. 26 is a view illustrative of the manner in which a nozzle is moved back and forth vertically when the gear is washed.

Further alternatively, as shown in FIG. 26, while the gear 112 is being rotated in unison with the spindle 142 in the direction indicated by the arrow A and also while the nozzle 172 is being moved back and forth in the directions indicated by the arrows Z by the Z-axis slide unit 48, only the water 118 is ejected from the nozzle 172 to the gear 112. To improve the ability to wash the gear 112, the operations shown in FIGS. 24 through 26 may be combined with each other.

In the second embodiment, the means for drying glass beads, the metering valve 184, the negative pressure meter 186, and the laser flowmeter 188 are combined with the glass bead supply mechanism 128. However, they may be combined with the hopper 24 according to the first embodiment.

Figure 27:
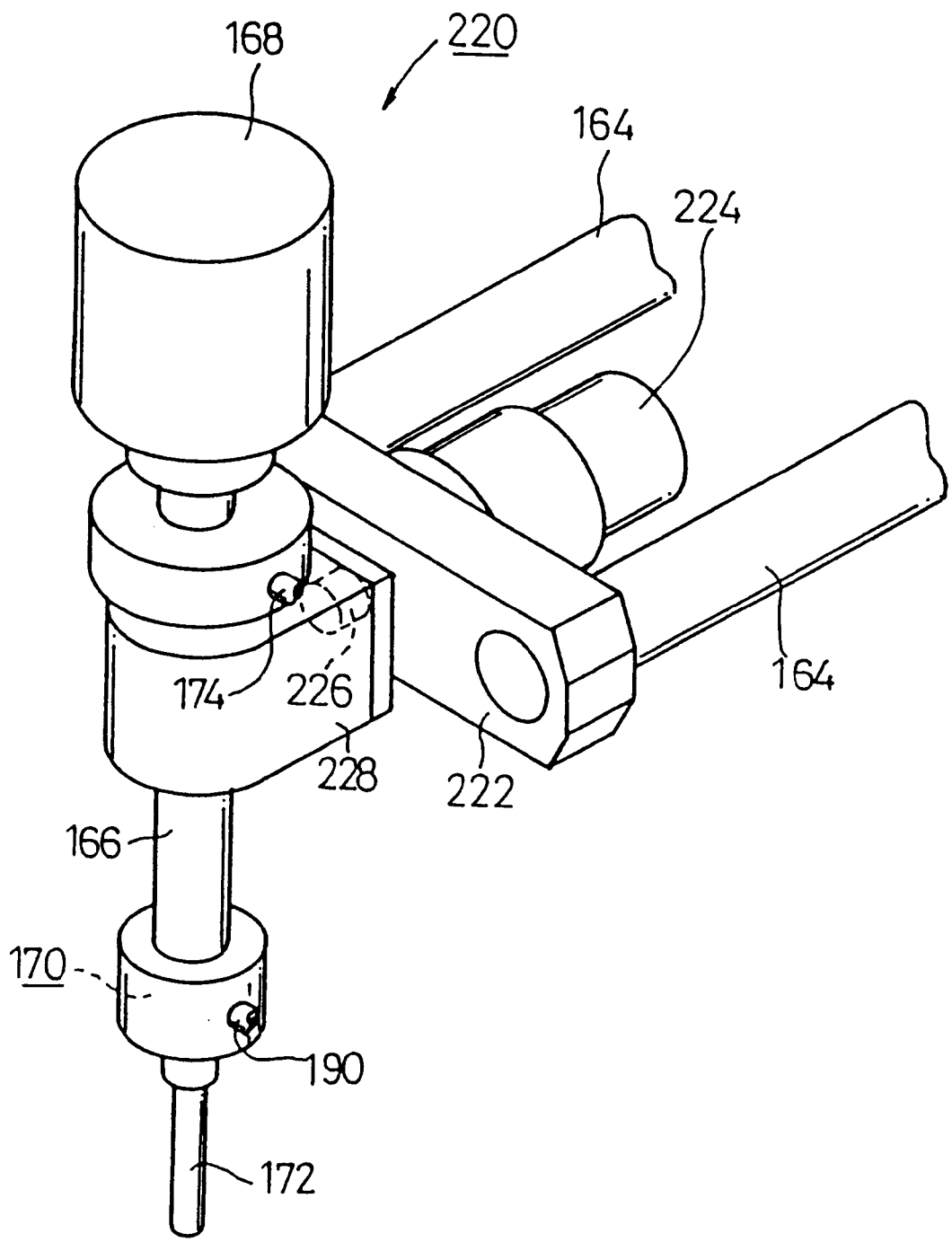
FIG. 27 is a perspective view of an ejection mechanism for applying glass balls in an apparatus for increasing the strength of a metal component according to a third embodiment of the present invention.
Figure 28:
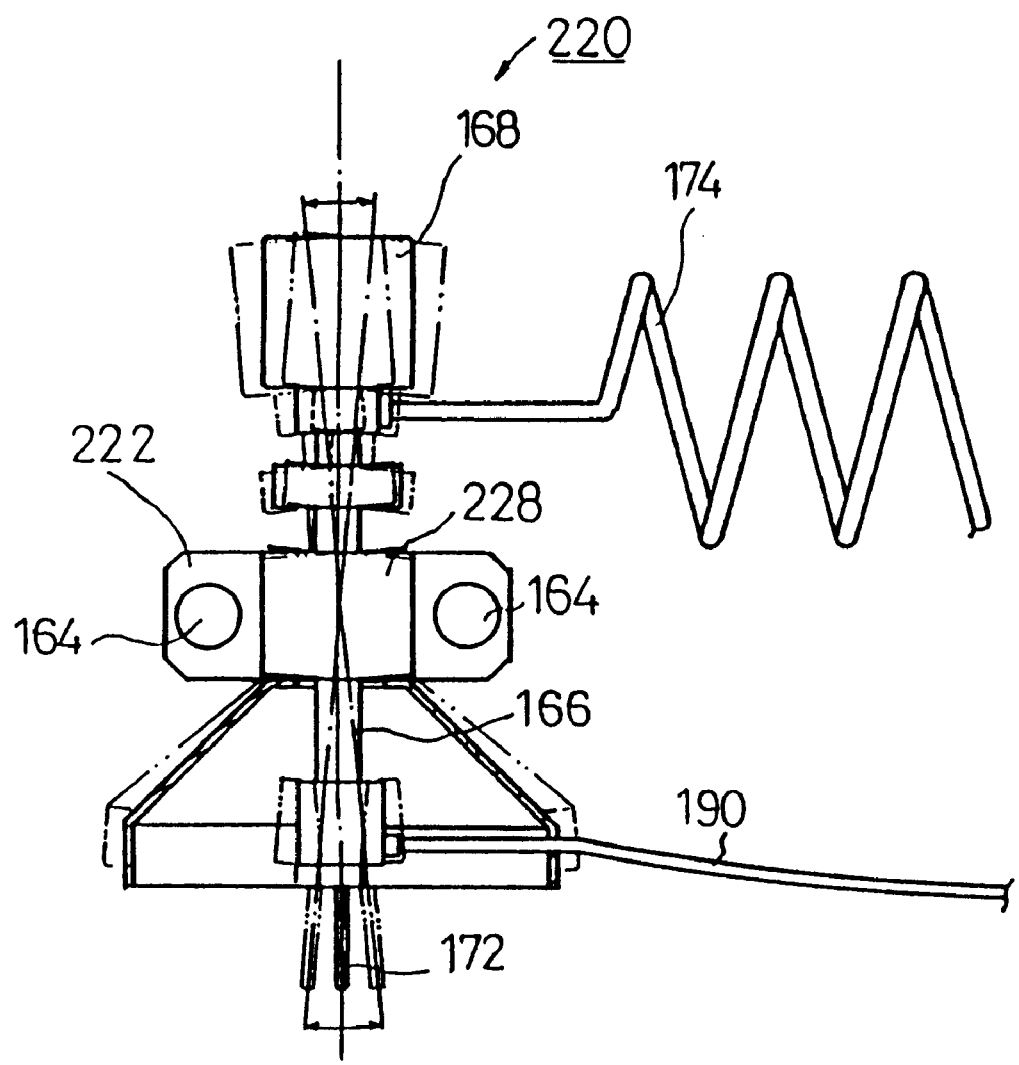
FIG. 28 is a front elevational view of the ejection mechanism for applying glass balls.

FIGS. 27 and 28 show an ejection mechanism 220 for applying glass balls in an apparatus for increasing the strength of a metal component according to a third embodiment of the present invention. Those parts of the ejection mechanism 220 which are identical to those of the ejection mechanism 124 according to the second embodiment are denoted by identical reference numerals, and will not be described in detail below.

The ejection mechanism 220 has a support plate 222 fixed to distal ends of a pair of support rods 164. A swing motor 224, serving as tilting means, is fixedly mounted on the support plate 222. The swing motor 224 has a rotatable drive shaft 226 on which a pipe 166 is mounted by an angular movable member 228.

Figure 29:
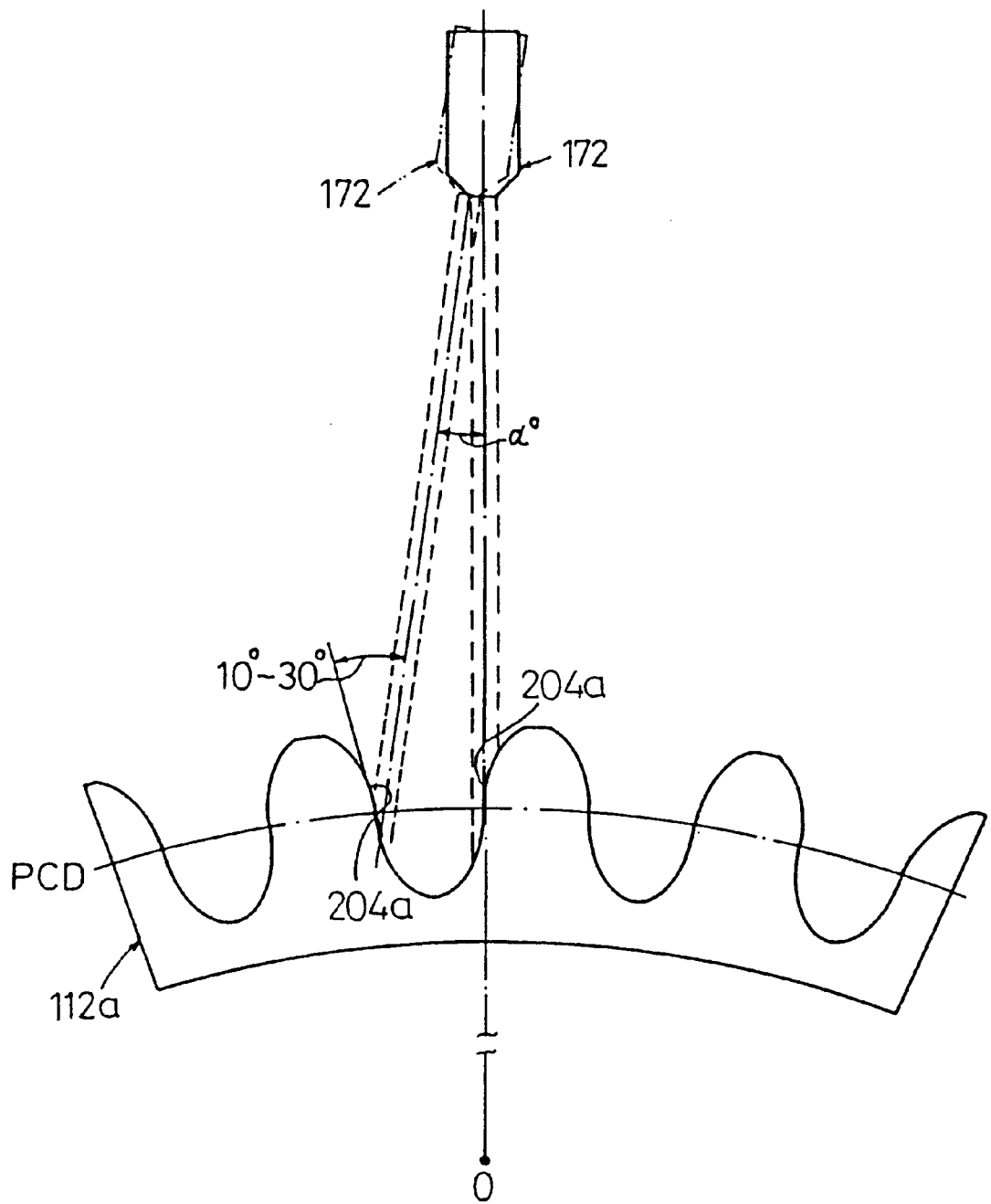
FIG. 29 is a view illustrative of an angle adjusting process carried out by the ejection mechanism shown in FIG. 28.

As shown in FIG. 29, when a gear 112a whose tooth flank 204a has a small pressure angle is processed, the swing motor 224 is energized to cause the rotatable drive shaft 226 to tilt the angular movable member 228 and the pipe 166 through a predetermined angle. Therefore, the nozzle 172 is tilted through a predetermined angle α° from a direction directed to the center O of the gear 112a and oriented toward the tooth flank 204a of the gear 204 (see the two-dot-and-dash lines in FIG. 29). Therefore, the ejection angle of the spouted jet 122 ejected from the nozzle 172 changes to an angular range from 10° to 30°.

Consequently, various gears 112, 112a having different pressure angles can easily be processed simply by tilting the nozzle 172. In addition, the spouted jet 122 can be applied to both tooth flanks 204, 204a of the gears 112, 112a within the angular range from 10° to 30°.

Heretofore, after one of the tooth flanks 204, 204a has been processed to increase its strength, the gears 112, 112a are detached from the spindle 142, reversed, and then attached to the spindle 142 for processing the other of the tooth flanks 204, 204a to increase its strength. According to the third embodiment, the nozzle 172 is tiltable symmetrically laterally across the straight line (L) interconnecting the center (O) of the gears 112, 112a and the center of the nozzle 172. Once the gears 112, 112a are mounted on the spindle 142, simply by reversing the rotation of the gears 112, 112a, both the tooth flanks 204, 204a can be processed to increase their strength without having to detaching and attaching the gears 112, 112a. Therefore, the gears 112, 112a can be processed to increase their strength highly efficiently.

Figure 30:
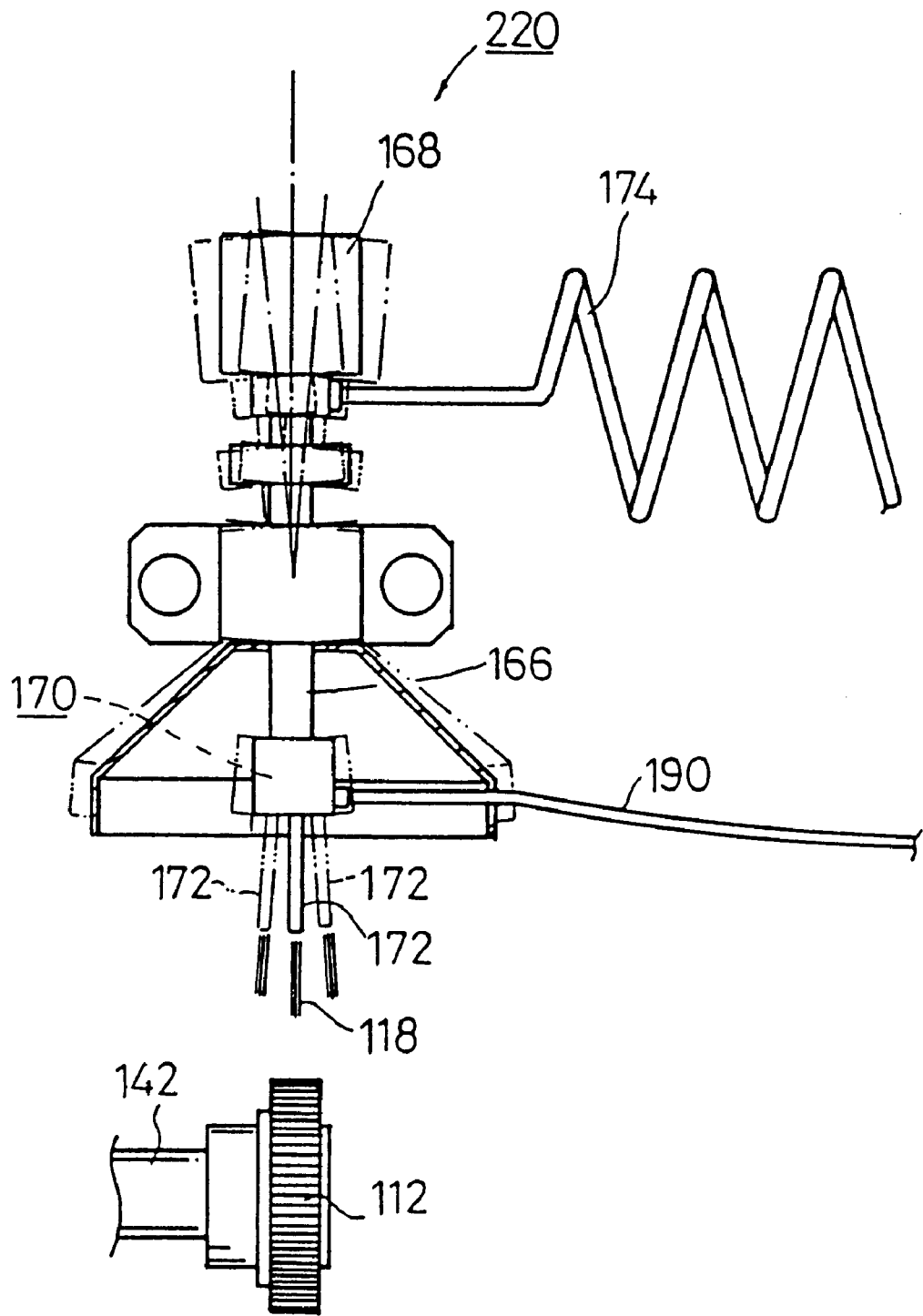
FIG. 30 is a view illustrative of a washing process carried out by the ejection mechanism shown in FIG. 28.

When the gear 112 is washed, the swing motor 224 is energized to cause the rotatable drive shaft 226 to tilt the angular movable member 228 and the pipe 166 through a predetermined angle, and only the water 118 is ejected from the nozzle 172 to the gear 112 (see FIG. 30). Accordingly, the washing water 118 can be applied in various directions to the gear 112 for increasing the efficiency with which to wash the gear 112.

Figure 31:
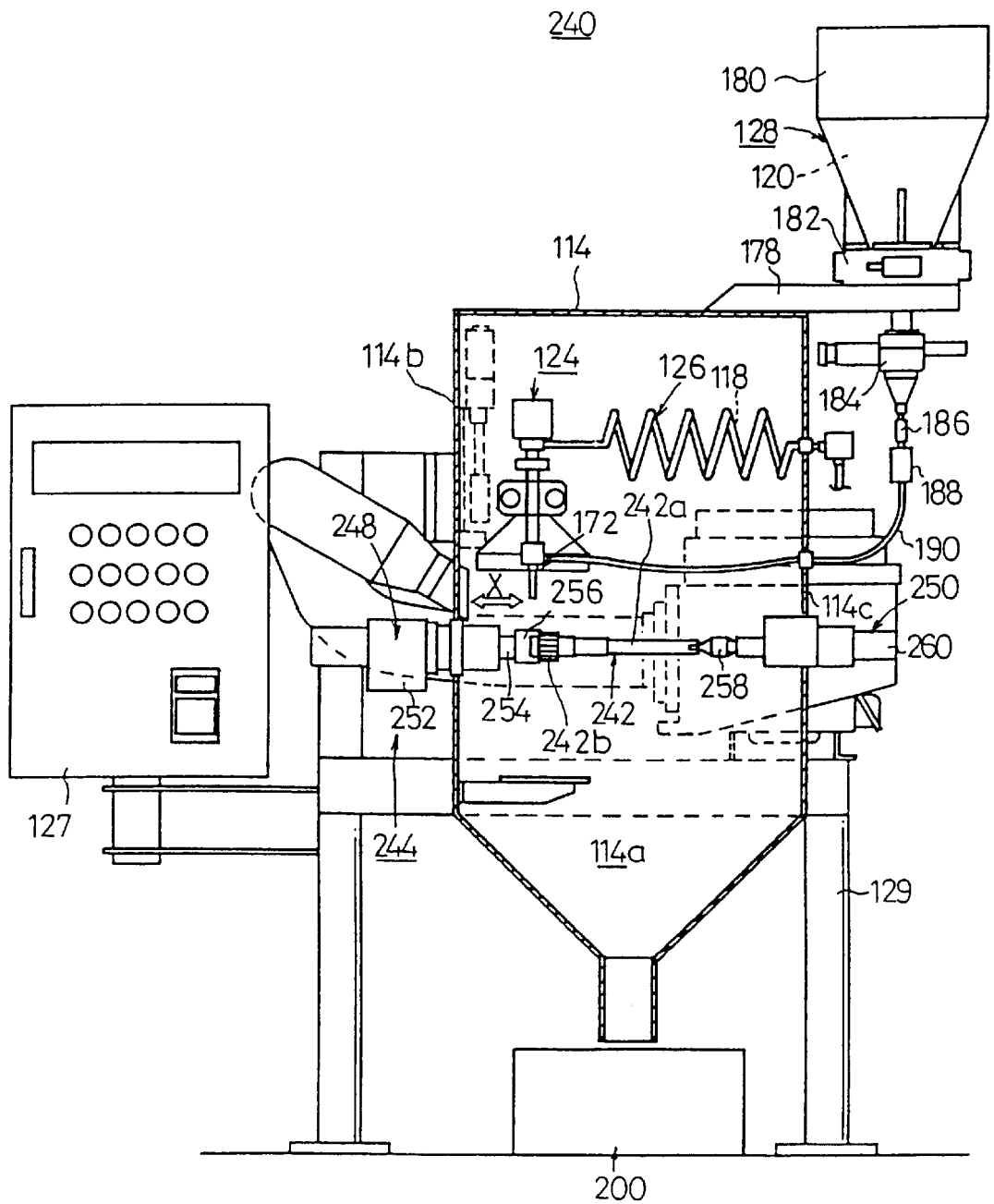
FIG. 31 is a front elevational view, partly in cross section, of an apparatus for increasing the strength of a metal component according to a fourth embodiment of the present invention.
Figure 32:
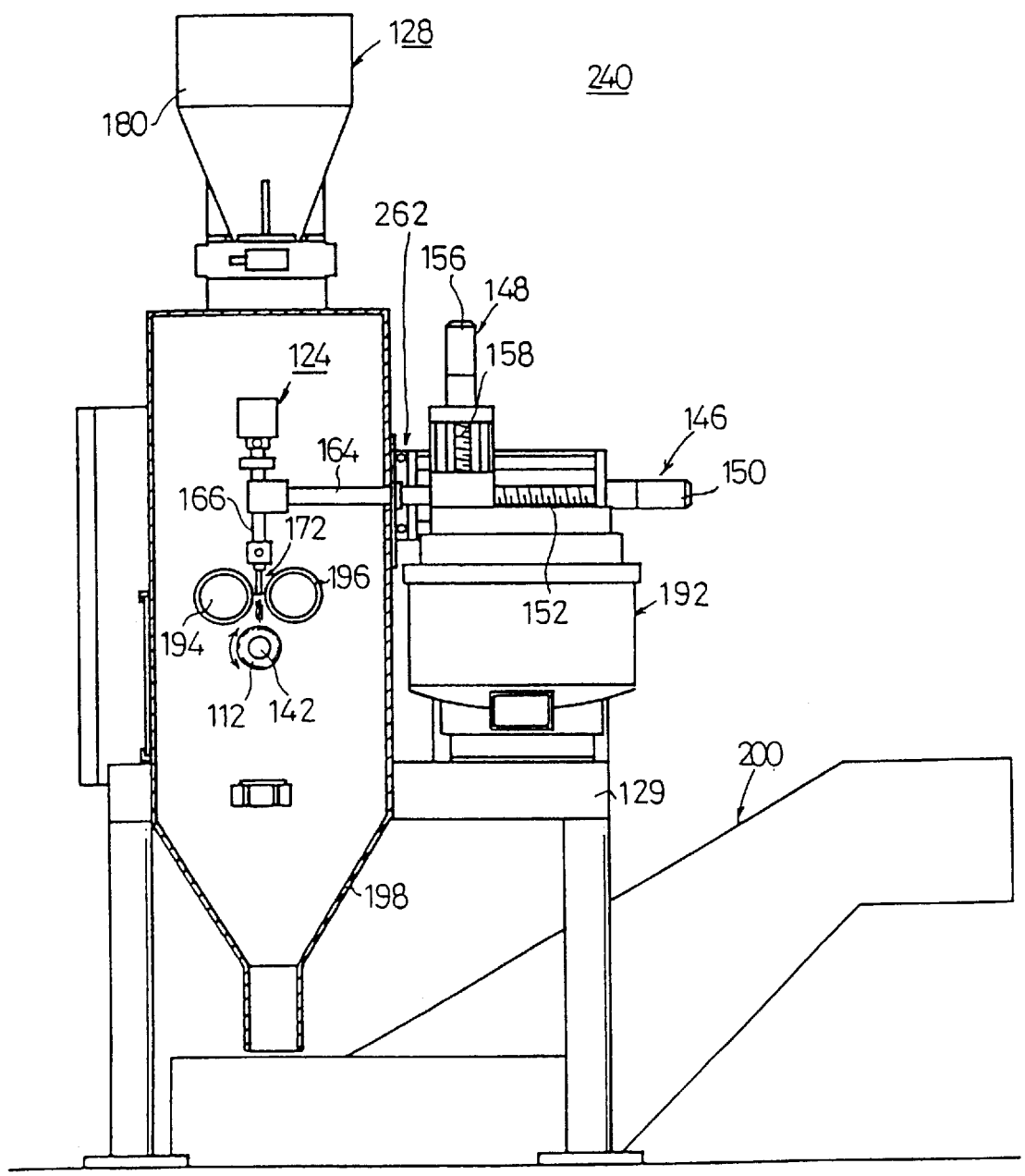
FIG. 32 is a side elevational view, partly in cross section, of the apparatus shown in FIG. 31.

FIGS. 31 and 32 show an apparatus 240 for increasing the strength of a metal component according to a fourth embodiment of the present invention. Those parts of the apparatus 240 which are identical to those of the apparatus 110 according to the second embodiment are denoted by identical reference numerals, and will not be described in detail below.

The apparatus 240 has a gear holding mechanism 244 for holding a relatively long workpiece 242. The workpiece 242 comprises a long rod 242a and a gear 242b integrally formed with an end of the rod 242a.

The gear holding mechanism 244 comprises a spindle unit 248 disposed on the side wall 114b of the casing 114, and a rotatable centering unit (centering support means) 250 disposed on the opposite side wall 114c of the casing 114 in coaxial relation to the spindle unit 248.

The spindle unit 248 has a spindle 254 coupled to a spindle motor 252. A gripper 256 for fitting over an end of the gear 242b is mounted on a distal end of the spindle 254. The rotatable centering unit 250 has a centering member 258 for supporting an end of the rod 242a of the workpiece 242. The centering member 258 is movable back and forth in the directions indicated by the arrows X by a cylinder 260.

As shown in FIG. 32, the ejection mechanism 124 has an X-axis slide unit (third slide unit) 262. The X-axis slide unit 262 is secured to the side wall 114c of the casing 114 for moving the Y-axis slide unit 146 in unison with the Z-axis slide unit 148 back and forth in the directions indicated by the arrows X through a motor and a ball screw mechanism (not shown).

In the apparatus 240, the end of the gear 242b is fitted in the gripper 256, and the end of the rod 242a is supported by the centering member 258. The workpiece 242 is thus positioned and held by the gear holding mechanism 244.

Then, the spindle motor 252 of the spindle unit 248 is energized to cause the spindle 254 to rotate the workpiece 242 in unison with the gripper 256. The X-axis slide unit 262 is operated to move the nozzle 172 in the directions indicated by the arrows X, while at the same time the spouted jet 122 is ejected from the nozzle 172 to the gear 242b of the workpiece 242 to process the gear 242b to increase its strength.

Therefore, the apparatus 240 according to the fourth embodiment offers the same advantages as those of the apparatus 110 according to the second embodiment.

As shown in FIG. 33, while the nozzle 172 is being translated transversely across the gear 112 (in the direction indicated by the arrow X1 and the direction indicated by the arrow X2) by the X-axis slide unit 262, only the water 118 is ejected from the nozzle 172 to the gear 112 to wash the gear 112.

Figure 34:
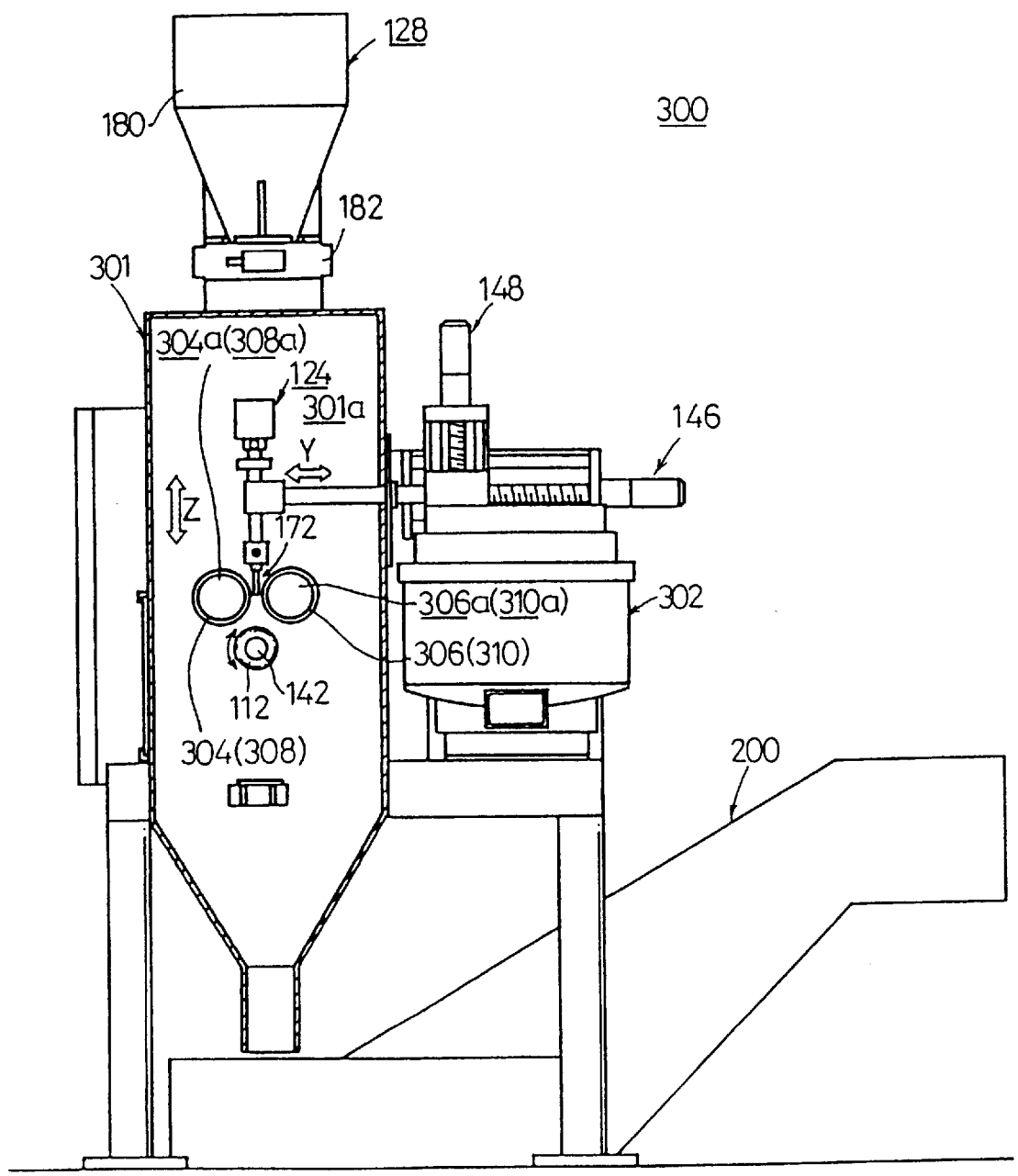
FIG. 34 is a front elevational view, partly in cross section, of an apparatus for increasing the strength of a metal component according to a fifth embodiment of the present invention.
Figure 35:
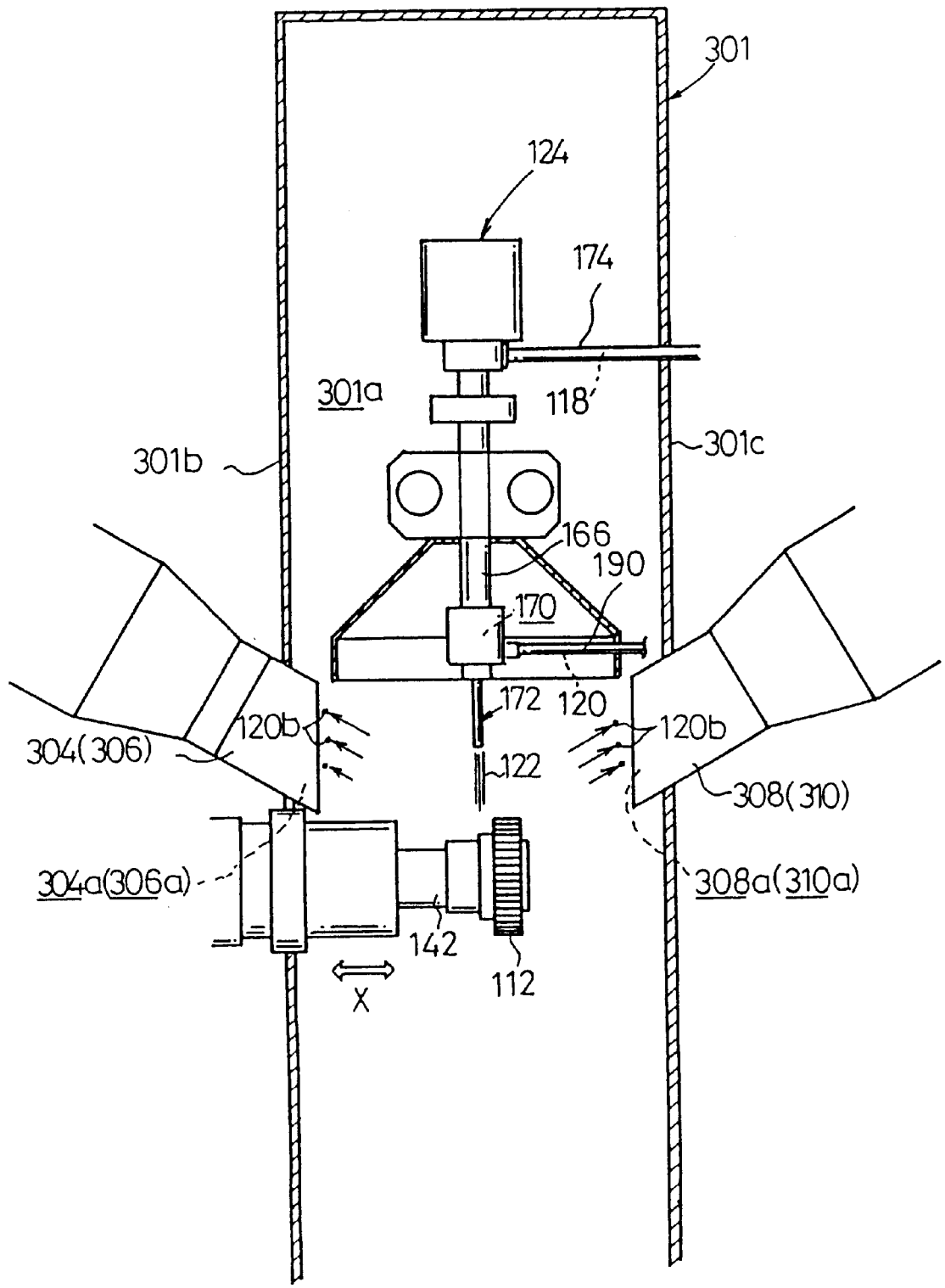
FIG. 35 is an enlarged fragmentary side elevational view of the apparatus according to the fifth embodiment.

FIGS. 34 and 35 show an apparatus 300 for increasing the strength of a metal component according to a fifth embodiment of the present invention. Those parts of the apparatus 300 which are identical to those of the apparatus 110 according to the second embodiment are denoted by identical reference numerals, and will not be described in detail below.

The apparatus 300 has a casing 301 which is of a minimum required width capable of housing the ejection mechanism 124 therein, and a mist collecting mechanism 302. The mist collecting mechanism 302 has a negative pressure source (not shown) from which four ducts 304, 306, 308, 310 extend.

The ducts 304, 306 have distal ends inserted through a side wall 301b of the casing 301 into a chamber 301a. The distal ends of the ducts 304, 306 have respective first and second openings (suction ports) 304a, 306a which open between the gear 112 and the nozzle 172 closely to the gear 112. The ducts 308, 310 have distal ends inserted through an opposite side wall 301c of the casing 301 into the chamber 301a. The distal ends of the ducts 308, 310 have respective third and fourth openings (suction ports) 308a, 310a which open between the gear 112 and the nozzle 172 closely to the gear 112.

In the apparatus 300, the spouted jet 122 is ejected from the ejection mechanism 124 to the gear 112, which is rotated and axially moved, for thereby processing the gear 112 to increase its strength. At the same time, the mist collecting mechanism 300 is operated.

A mist containing particular dust 120b which is floating in the chamber 301a closely to the gear 112 is drawn from the first, second, third, and fourth openings 304a, 306a, 308a, 310a which open closely to the gear 112 through the four ducts 304, 306, 308, 310. The particular dust 120b is thus drawn and collected reliably and efficiently.

INDUSTRIAL APPLICABILITY

According to the present invention, as described above, since a spouted jet of glass beads and a liquid is ejected to a metal component, compressive residual stresses are imparted to a surface of the metal component and the surface of the metal component is ground by the glass beads and the liquid. When the glass beads are crushed by collision with the metal component, broken pieces of the crushed glass beads are pressed against the surface of the metal component by the liquid ejected to the metal component, thereby grinding the metal component. Consequently, the glass beads are oriented to efficiently collide with the metal component, and the glass beads and the liquid effectively function to increase the strength of the metal component and grind the metal component.

According to the present invention, furthermore, when a spouted jet of glass beads and a liquid is ejected to a surface of a gear after it has been heated, compressive residual stresses are imparted to the gear, and an oxide layer is removed from the surface of the gear and the surface of the gear is smoothed by the crushing of the glass beads.

According to the present invention, furthermore, when a spouted jet of a liquid delivered under pressure and a quantity of glass beads in a preset range is ejected to a surface of a gear after it has been heated, the glass beads are oriented to impart desired compressive residual stresses to the gear.

According to the present invention, furthermore, because only a liquid is ejected to a surface of a gear after it has been ground, glass bead dust in the form of fine powder particles attached to the surface of the gear is washed away by the liquid. Therefore, simply by stopping the supply of the glass beads, the surface of the gear can efficiently be washed, and the overall process of processing the gear to increase its strength is efficiently and easily carried out.

Glass beads in the nozzle are reliably drawn out under a negative pressure developed when the liquid is ejected, so that the nozzle will not be clogged by remaining glass bead dust.

A mist containing particular dust produced when the glass beads are crushed is reliably drawn from suction ports which are positioned in the chamber closely to the gear. Therefore, the particular dust floating in the chamber is effectively prevented from being attached to movable parts including the spindle, etc.

According to the present invention, furthermore, the glass bead supply mechanism has means for drying glass beads to preventing glass beads from sticking together due to moisture. Consequently, even though the glass beads absorb water because the liquid is used and the glass beads have small particle diameters, the glass beads do not form a clog in the glass bead supply mechanism. The glass beads are thus supplied reliably at a given rate from the glass bead supply mechanism to the ejection mechanism.

We claim:

1. A method of increasing the strength of a metal component, characterized by:

heating a metal component to thereby impart compressive residual stresses to the metal component;

ejecting a spouted jet of a liquid and glass beads to said metal component after said metal component has been heated; and crushing said glass beads on the surface of said metal component to thereby remove an oxide layer from the surface of said metal component and to smooth the surface of said metal component.

2. A method of increasing the strength of a metal component, according to claim 1, wherein said metal component comprises a gear, and the spouted jet of the liquid and the glass beads is ejected to a root of said gear.

3. A method of increasing the strength of a metal component, according to claim 1, wherein said metal component comprises a gear, said spouted jet of a liquid and glass beads is ejected from a nozzle to a surface of said gear, and the glass beads are crushed by the surface of the gear and smooth at least a surface of the gear extending from a portion of a tooth flank which corresponds to a pitch circle diameter to a root of said gear.

4. A method of increasing the strength of a metal component, according to claim 3, wherein said spouted jet is ejected at an acute angle to the portion of the tooth flank which corresponds to the pitch circle diameter.

5. A method of increasing the strength of a metal component, according to claim 4, wherein said acute angle ranges from 10° to 30°.

6. A method of increasing the strength of a metal component according to claim 3, wherein said nozzle ejects said spouted jet in an attitude tilted a predetermined angle from an attitude which is oriented toward the center of said gear, to the surface of the gear.

7. A method of increasing the strength of a metal component, according to claim 1, wherein said metal component comprises a gear, said liquid is delivered under pressure, said glass beads are in a preset range, said spouted jet is ejected to a surface of said gear, and the glass beads are crushed by the surface of the gear to remove an oxide layer from the surface of the gear, in a processing chamber.

8. A method of increasing the strength of a metal component, according to claim 7, wherein said spouted jet contains said glass beads in a range from 2 volume % to 19 volume % of the liquid flow.

9. A method of increasing the strength of a metal component, according to claim 8, wherein said spouted jet contains said glass beads in a range from 3 volume % to 10 volume % of the liquid flow.

10. A method of increasing the strength of a metal component, according to claim 7, wherein said quantity of glass beads which are ejected ranges from 5 mg/mm$^2$ to 16 mg/mm$^2$.

11. A method of increasing the strength of a metal component, according to claim 10, wherein said quantity of glass beads which are ejected ranges from 5 mg/mm$^2$ to 9 mg/mm$^2$.

12. A method of increasing the strength of a metal component, according to claim 3, wherein said nozzle ejects said spouted jet from a position which is parallel to a straight line interconnecting the axis of the nozzle and the center of the gear and is spaced a predetermined distance from the straight line, to the surface of the gear.

13. A method of increasing the strength of a metal component, according to claim 1, wherein said metal component comprises a gear, said spouted jet of a liquid and glass beads is ejected from a nozzle to a surface of said gear, and the glass beads are crushed on the surface of the gear to grind the gear; and wherein said method further includes the step of washing the surface of said gear by ejecting only said liquid to the surface of said gear after the gear has been ground.

14. A method of increasing the strength of a metal component, according to claim 13, wherein in said step of washing, only said liquid is ejected to the surface of said gear while said gear is being rotated alternately in a normal direction and an opposite direction.

15. A method of increasing the strength of a metal component, according to claim 13, wherein in said step of washing, only said liquid is ejected to the surface of said gear while said nozzle is being moved with respect to said gear.

16. A method of increasing the strength of a metal component, according to claim 14, wherein in said step of washing, only said liquid is ejected to the surface of said gear while said nozzle is being moved with respect to said gear.

17. A method of increasing the strength of a metal component, according to claim 1, wherein said spouted jet is ejected substantially along a line toward said metal component at a sufficient force and predetermined ejection angle to cause said crushing of said glass beads on the surface of said metal component.

18. An apparatus for increasing the strength of a metal component, comprising:

an ejection mechanism for ejecting a spouted jet of a liquid and glass beads to a metal component;

a liquid supply mechanism for supplying said liquid under pressure to said ejection mechanism; and a glass bead supply mechanism for delivering said glass beads to said ejection mechanism, wherein said ejection mechanism includes means for forcibly ejecting said spouted jet substantially along a line toward said metal component at a sufficient force and predetermined ejection angle to cause said glass beads to be crushed on the surface of said metal component, to thereby remove an oxide layer from the surface of said metal component and to smooth the surface of said metal component, and wherein said glass bead supply mechanism has means for drying the glass beads to prevent the glass beads from sticking to each other by moisture.

19. An apparatus for increasing the strength of a metal component, according to claim 18, wherein said ejection mechanism has:

a nozzle for constricting a passage for supplying said liquid therethrough; and a mixing chamber disposed downstream of said nozzle, for mixing said liquid and said glass beads with each other.

20. An apparatus for increasing the strength of a metal component, according to claim 18, wherein said means for drying the glass beads comprises a heater mounted on a hopper for storing said glass beads therein.

21. An apparatus for increasing the strength of a metal component, according to claim 18, wherein said glass bead supply mechanism comprises:

a pipe for passing said glass beads therethrough; and a flow rate sensor for detecting a rate at which said glass beads flow through said pipe.

22. An apparatus for increasing the strength of a metal component, according to claim 21, comprising a pressure sensor for detecting a pressure in said pipe.

23. An apparatus for increasing the strength of a metal component, comprising:

an ejection mechanism for ejecting a spouted jet of a liquid and glass beads to a metal component;

a liquid supply mechanism for supplying said liquid under pressure to said ejection mechanism; and a glass bead supply mechanism for delivering said glass beads to said ejection mechanism, wherein said ejection mechanism includes means for forcibly ejecting said spouted jet substantially along a line toward said metal component at a sufficient force and predetermined ejection angle to cause said glass beads to be crushed on the surface of said metal component, to thereby remove an oxide layer from the surface of said metal component and to smooth the surface of said metal component, and further comprising a processing chamber in which the spouted jet of the liquid and the glass beads is ejected; and a collecting mechanism for drawing and collecting particulate dust produced when said glass beads are crushed by a surface of the metal component, wherein said collecting mechanism has suction ports opening in said processing chamber, and wherein said suction ports include first and second suction ports disposed in sandwiching relation to said nozzle.

24. An apparatus for increasing the strength of a metal component, comprising:

an ejection mechanism for ejecting a spouted jet of a liquid and glass beads to a metal component;

a liquid supply mechanism for supplying said liquid under pressure to said ejection mechanism; and a glass bead supply mechanism for delivering said glass beads to said ejection mechanism, wherein said ejection mechanism includes means for forcibly ejecting said spouted jet substantially along a line toward said metal component at a sufficient force and predetermined ejection angle to cause said glass beads to be crushed on the surface of said metal component, to thereby remove an oxide layer from the surface of said metal component and to smooth the surface of said metal component, and further comprising a processing chamber in which the spouted jet of the liquid and the glass beads is ejected; and a collecting mechanism for drawing and collecting particulate dust produced when said glass beads are crushed by a surface of the metal component, wherein said collecting mechanism has suction ports opening in said processing chamber, and wherein said suction ports include first, second, third, and fourth suction ports disposed in surrounding relation to nozzle.

25. An apparatus for increasing the strength of a metal component, comprising:

a gear holding mechanism for positioning and holding a gear as a metal component after it has been heated, in a processing chamber;

an ejection mechanism for ejecting a spouted jet of a liquid and glass beads to said gear;

a liquid supply mechanism for supplying said liquid under pressure to said ejection mechanism; and a glass bead supply mechanism for delivering said glass beads at a predetermined rate to said ejection mechanism, wherein said ejection mechanism includes means for forcibly ejecting said spouted jet substantially along a line toward said gear at a sufficient force and predetermined ejection angle to cause said glass beads to be crushed on the surface of said gear to thereby remove an oxide layer from the surface of said gear to smooth the surface of said gear, and wherein said gear holding mechanism comprises:

a spindle unit for holding and rotating said gear in a predetermined direction; and a slide unit for moving said spindle unit with said gear held thereby, back and forth in axial directions of the gear.

26. An apparatus for increasing the strength of a metal component, according to claim 25, wherein said liquid supply mechanism and said glass bead supply mechanism are disposed on one side of said processing chamber remotely from said gear holding mechanism.

27. An apparatus for increasing the strength of a metal component, according to claim 25, wherein said glass bead supply mechanism comprises:

a pipe for passing said glass beads therethrough; and a flow rate sensor for detecting a rate at which said glass beads flow through said pipe.

28. An apparatus for increasing the strength of a metal component, according to claim 27, comprising a pressure sensor for detecting a pressure in said pipe.

29. An apparatus for increasing the strength of a metal component, comprising:

a gear holding mechanism for positioning and holding a gear as a metal component after it has been heated, in a processing chamber;

an ejection mechanism for ejecting a spouted jet of a liquid and glass beads to said gear;

a liquid supply mechanism for supplying said liquid under pressure to said ejection mechanism; and a glass bead supply mechanism for delivering said glass beads at a predetermined rate to said ejection mechanism, wherein said ejection mechanism includes means for forcibly ejecting said spouted jet substantially along a line toward said gear at a sufficient force and predetermined ejection angle to cause said glass beads to be crushed on the surface of said gear to thereby remove an oxide layer from the surface of said gear to smooth the surface of said gear, and wherein said gear holding mechanism comprises:

a spindle unit for holding and rotating an end of said gear in a predetermined direction; and centering support means for engaging an opposite end of said gear.

30. An apparatus for increasing the strength of a metal component, comprising:

a gear holding mechanism for positioning and holding a gear as a metal component after it has been heated, in a processing chamber;

an ejection mechanism for ejecting a spouted jet of a liquid and glass beads to said gear;

a liquid supply mechanism for supplying said liquid under pressure to said ejection mechanism; and a glass bead supply mechanism for delivering said glass beads at a predetermined rate to said ejection mechanism, wherein said ejection mechanism includes means for forcibly ejecting said spouted jet substantially along a line toward said gear at a sufficient force and predetermined ejection angle to cause said glass beads to be crushed on the surface of said gear to thereby remove an oxide layer from the surface of said gear to smooth the surface of said gear, wherein said ejection mechanism comprises:

a nozzle for ejecting the spouted jet of the liquid and the glass beads; and displacing means for displacing said nozzle toward and away from said gear, and wherein said displacing means comprise:

a first slide unit for translating said nozzle in a diametrical direction of said gear; and a second slide unit for moving said nozzle in an axial direction of the nozzle.

31. An apparatus for increasing the strength of a metal component, according to claim 30, wherein said displacing means comprise a third slide unit for translating said nozzle in an axial direction of said gear.

32. An apparatus for increasing the strength of a metal component, comprising:

a gear holding mechanism for positioning and holding a gear as a metal component after it has been heated, in a processing chamber;

an ejection mechanism for ejecting a spouted jet of a liquid and glass beads to said gear;

a liquid supply mechanism for supplying said liquid under pressure to said ejection mechanism; and a glass bead supply mechanism for delivering said glass beads at a predetermined rate to said ejection mechanism, wherein said ejection mechanism includes means for forcibly ejecting said spouted jet substantially along a line toward said gear at a sufficient force and predetermined ejection angle to cause said glass beads to be crushed on the surface of said gear to thereby remove an oxide layer from the surface of said gear to smooth the surface of said gear, wherein said ejection mechanism comprises:

a nozzle for ejecting the spouted jet of the liquid and the glass beads; and displacing means for displacing said nozzle toward and away from said gear, and wherein said displacing means comprise tilting means for tilting said nozzle in a predetermined angular range from an attitude oriented to the center of said gear.

33. An apparatus for increasing the strength of a metal component, comprising:

a gear holding mechanism for positioning and holding a gear as a metal component after it has been heated, in a processing chamber;

an ejection mechanism for ejecting a spouted jet of a liquid and glass beads to said gear;

a liquid supply mechanism for supplying said liquid under pressure to said ejection mechanism; and a glass bead supply mechanism for delivering said glass beads at a predetermined rate to said ejection mechanism, wherein said ejection mechanism includes means for forcibly ejecting said spouted jet substantially along a line toward said gear at a sufficient force and predetermined ejection angle to cause said glass beads to be crushed on the surface of said gear to thereby remove an oxide layer from the surface of said gear to smooth the surface of said gear, and wherein said glass bead supply mechanism has means for drying the glass beads to prevent the glass beads from sticking to each other by moisture.

34. An apparatus for increasing the strength of a metal component, according to claim 33, wherein said means for drying the glass beads comprises a heater mounted on a hopper for storing said glass beads therein.

35. An apparatus for increasing the strength of a metal component, comprising:

a gear holding mechanism for positioning and holding a gear as a metal component after it has been heated, in a processing chamber;

an ejection mechanism for ejecting a spouted jet of a liquid and glass beads to said gear;

a liquid supply mechanism for supplying said liquid under pressure to said ejection mechanism; and a glass bead supply mechanism for delivering said glass beads at a predetermined rate to said ejection mechanism, wherein said ejection mechanism includes means for forcibly ejecting said spouted jet substantially along a line toward said gear at a sufficient force and predetermined ejection angle to cause said glass beads to be crushed on the surface of said gear to thereby remove an oxide layer from the surface of said gear to smooth the surface of said gear, and further comprising a collecting mechanism for drawing and collecting particulate dust produced when said glass beads are crushed by a surface of the gear, wherein said collecting mechanism has section ports opening in said processing chamber, and wherein said suction ports include first and second suction ports disposed in sandwiching relation to said nozzle.

36. An apparatus for increasing the strength of a metal component, comprising:

a gear holding mechanism for positioning and holding a gear as a metal component after it has been heated, in a processing chamber;

an ejection mechanism for ejecting a spouted jet of a liquid and glass beads to said gear;

a liquid supply mechanism for supplying said liquid under pressure to said ejection mechanism; and a glass bead supply mechanism for delivering said glass beads at a predetermined rate to said ejection mechanism, wherein said ejection mechanism includes means for forcibly ejecting said spouted jet substantially along a line toward said gear at a sufficient force and predetermined ejection angle to cause said glass beads to be crushed on the surface of said gear to thereby remove an oxide layer from the surface of said gear to smooth the surface of said gear, and further comprising a collecting mechanism for drawing and collecting particulate dust produced when said glass beads are crushed by a surface of the gear, wherein said collecting mechanism has section ports opening in said processing chamber, and wherein said suction ports include first, second, third, and fourth suction ports disposed in surrounding relation to said nozzle.

* * * * *